United States Patent
Seo

(10) Patent No.: US 8,896,942 B2
(45) Date of Patent: Nov. 25, 2014

(54) ZOOM LENS SYSTEM AND IMAGE PICKUP APPARATUS

(75) Inventor: Jung-pa Seo, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 670 days.

(21) Appl. No.: 12/902,371

(22) Filed: Oct. 12, 2010

(65) Prior Publication Data

US 2011/0085249 A1  Apr. 14, 2011

(30) Foreign Application Priority Data

Oct. 13, 2009  (KR) .................. 10-2009-0097437

(51) Int. Cl.
*G02B 9/60* (2006.01)
*G02B 13/18* (2006.01)
*G02B 15/173* (2006.01)

(52) U.S. Cl.
CPC .............. *G02B 15/173* (2013.01); *G02B 13/18* (2013.01)
USPC ............................................. 359/764

(58) Field of Classification Search
USPC .......................................... 359/726, 763, 764
See application file for complete search history.

(56) References Cited

U.S. PATENT DOCUMENTS

| | | | |
|---|---|---|---|
| 7,164,543 B2 | 1/2007 | Arai | |
| 7,242,529 B2 | 7/2007 | Sato et al. | |
| 7,327,953 B2 | 2/2008 | Tamura | |
| 7,372,635 B2 | 5/2008 | Morooka et al. | |
| 7,433,131 B2 | 10/2008 | Iwasawa | |
| 7,505,212 B2 | 3/2009 | Omichi | |
| 7,746,562 B2* | 6/2010 | Katakura | 359/678 |
| 2007/0285520 A1 | 12/2007 | Kuroda | |
| 2008/0278824 A1* | 11/2008 | Shirota | 359/684 |
| 2009/0002840 A1 | 1/2009 | Shirota | |
| 2009/0284011 A1 | 11/2009 | McBride et al. | |
| 2009/0324207 A1 | 12/2009 | Hatakeyama et al. | |

FOREIGN PATENT DOCUMENTS

| | | | |
|---|---|---|---|
| JP | 2008-203417 | * | 4/2008 |
| JP | 2008-203471 A | | 9/2008 |
| KR | 1020070109840 A | | 11/2007 |
| KR | 1020070113956 A | | 11/2007 |

OTHER PUBLICATIONS

Office Action issued in related application CN201010508568.6, Dec. 23, 2013, 10 pages.

* cited by examiner

*Primary Examiner* — Joseph P Martinez
(74) *Attorney, Agent, or Firm* — Drinker Biddle & Reath LLP

(57) ABSTRACT

A zoom lens system and an image pickup apparatus including the same are provided. The zoom lens system includes a first lens group having a positive refractive power, a second lens group having a negative refractive power, a third lens group having a positive refractive power, a fourth lens group having a positive refractive power, and a fifth lens group having a positive refractive power, which are arranged in an order from an object side. When zooming is performed from a wide angle position to a telephoto position, the first lens group, the third lens group and the fifth lens group remain fixed and the second lens group and the fourth lens group move.

15 Claims, 20 Drawing Sheets

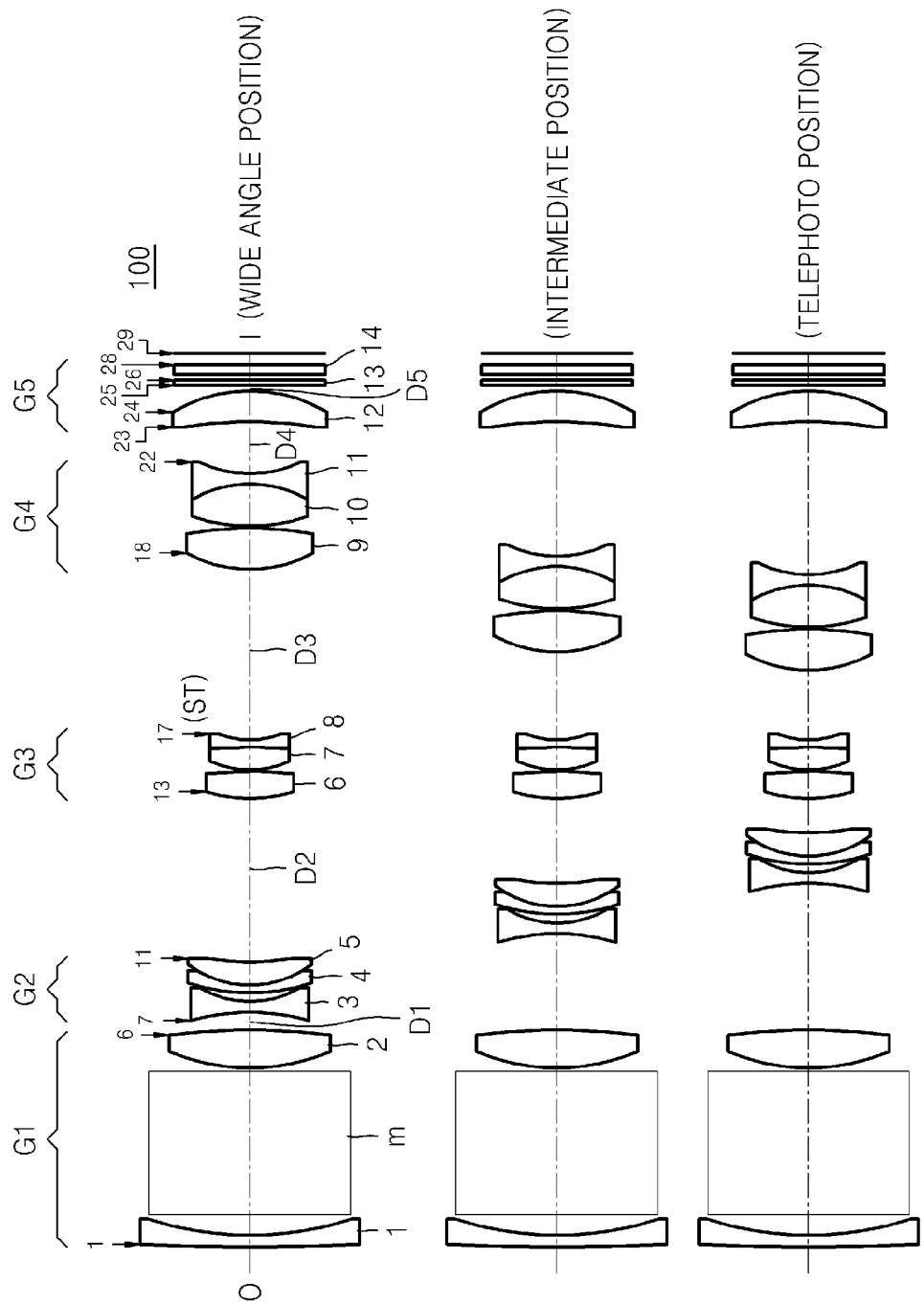

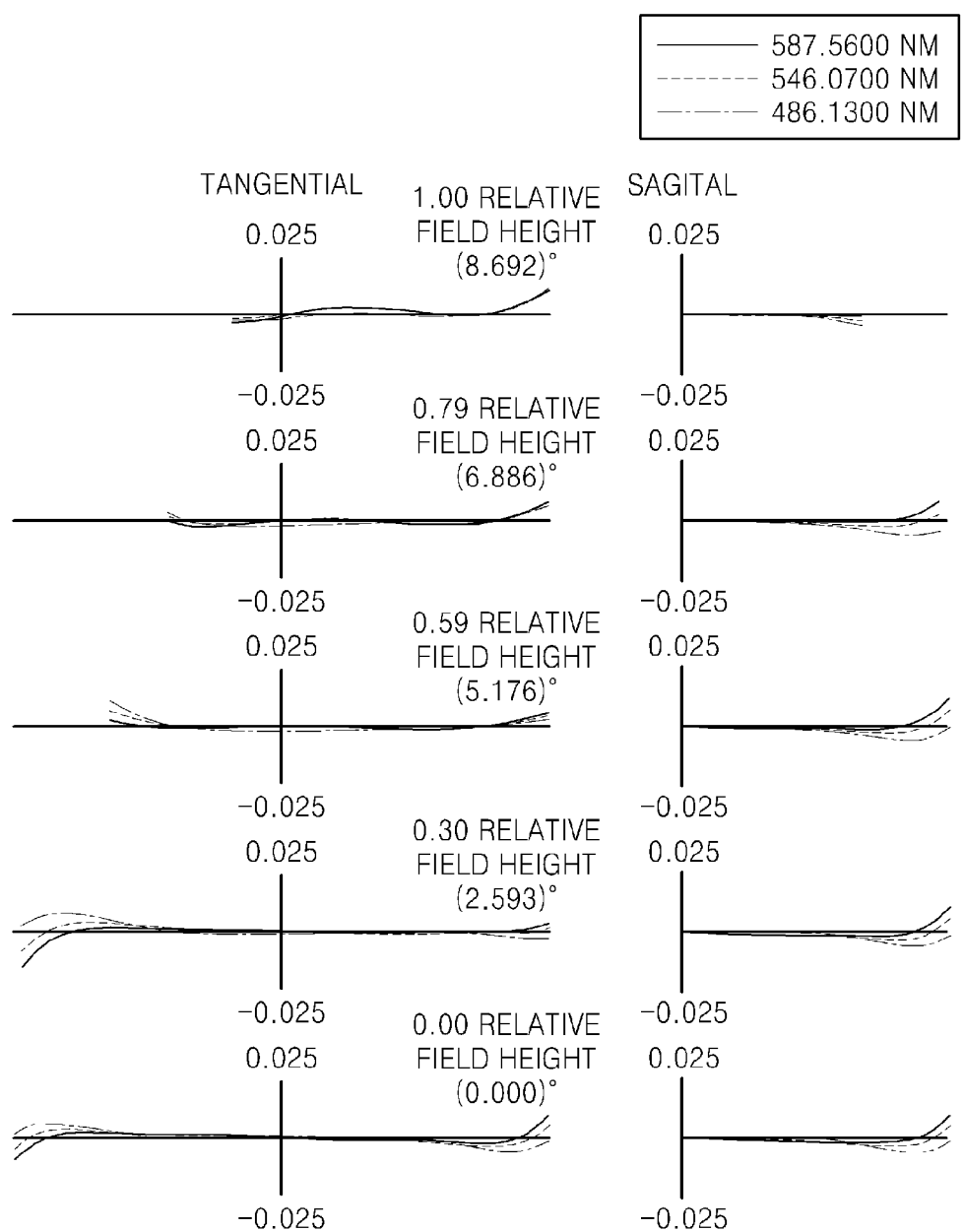

ZOOM LENS SYSTEM AND IMAGE PICKUP APPARATUS

CROSS-REFERENCE TO RELATED PATENT APPLICATION

This application claims the benefit of Korean Patent Application No. 10-2009-0097437, filed on Oct. 13, 2009, in the Korean Intellectual Property Office, the disclosure of which is incorporated herein in its entirety by reference.

BACKGROUND

The invention relates to a small zoom lens system having a high zoom ratio and an image pickup apparatus including the same.

Zoom lenses used in still cameras or video cameras require excellent optical performances, high zoom ratios and small sizes. Furthermore, as electronic devices such as personal digital assistants (PDAs) and mobile devices currently become popular, digital cameras or digital video units are included in most of the electronic devices and thus demand for small cameras is increasing.

Unlike film cameras that are carried by users only when needed, many users carry digital cameras ordinarily and thus small, thin and light digital cameras are in high demand. A small and thin digital camera may be realized by adopting a retractable barrel for extending a lens out of a camera in a photographing mode and accommodating the lens within the camera when the lens is not used, or an inner zoom barrel for reducing the thickness of a lens system by using a reflector such as a prism. In an optical system including a prism, the thickness of the optical system may be reduced by refracting an optical path by 90° in the middle of the optical system by using the prism.

When a small digital camera is realized by adopting an inner zoom barrel for reducing the thickness of a lens system by using a reflector such as a prism or a mirror, various methods such as a method of reducing an overall length of a lens system or a method of suppressing the sensitivity of each optical component are suggested.

SUMMARY

The invention provides a small zoom lens system having a high zoom ratio and an image pickup apparatus including the same.

According to an embodiment of the invention, there is provided a zoom lens system including a first lens group having a positive refractive power, a second lens group having a negative refractive power, a third lens group having a positive refractive power, a fourth lens group having a positive refractive power, and a fifth lens group having a positive refractive power, which are arranged in an order from an object side, wherein the first lens group includes one or more lenses having a negative refractive power, a reflector for changing an optical path, and one or more lenses having a positive refractive power, wherein, when zooming is performed from a wide angle position to a telephoto position, the first lens group, the third lens group and the fifth lens group remain fixed and the second lens group and the fourth lens group move, and wherein the zoom lens system satisfies Nd>1.94, where Nd represents an refractive index of the one or more lenses having a negative refractive power in the first lens group.

The zoom lens system may satisfy $6.5 \leq Lt/L2 \leq 7.5$, where Lt represents an overall length of the zoom lens system at the telephoto position and L2 represents an amount of movement of the second lens group when zooming is performed from the wide angle position to the telephoto position.

According to another aspect of the invention, there is provided a zoom lens system including a first lens group having a positive refractive power, a second lens group having a negative refractive power, a third lens group having a positive refractive power, a fourth lens group having a positive refractive power, and a fifth lens group having a positive refractive power, which are arranged in an order from an object side, wherein the first lens group includes a lens having a negative refractive power, a reflector for changing an optical path, and a lens having a positive refractive power, when zooming is performed from a wide angle position to a telephoto position, the second lens group and the fourth lens group move, and wherein the zoom lens system satisfies $6.5 \leq Lt/L2 \leq 7.5$, where Lt represents an overall length of the zoom lens system at the telephoto position and L2 represents an amount of movement of the second lens group when zooming is performed from the wide angle position to the telephoto position.

When zooming is performed from the wide angle position to the telephoto position, a distance between the first lens group and the third lens group may be reduced and a distance between the third lens group and the fourth lens group may also be reduced.

The second lens group may include one or more biconcave aspherical lenses.

The third lens group may include at least one aspherical lens.

The fourth lens group may perform focusing according to variations in distance to an object.

The fifth lens group may include a lens having a meniscus shape that is convex toward an image side.

The zoom lens system may satisfy $3.0 \leq F1/(Ft/Fw) \leq 3.9$, where F1 represents a focal length of the first lens group, Fw represents a focal length at the wide angle position of the zoom lens system, and Ft represents a focal length at the telephoto position of the zoom lens system.

The third lens group may include a stop on an image side surface of a lens that is the closest to the image side.

A back focal length of the zoom lens system may be less than a focal length at the wide angle position.

According to another aspect of the invention, there is provided an image pickup apparatus including a zoom lens system and an imaging device for receiving an image formed by the zoom lens system, wherein the zoom lens system includes a first lens group having a positive refractive power, a second lens group having a negative refractive power, a third lens group having a positive refractive power, a fourth lens group having a positive refractive power, and a fifth lens group having a positive refractive power, which are arranged in an order from an object side, wherein the first lens group includes one or more lenses having a negative refractive power, a reflector for changing an optical path, and one or more lenses having a positive refractive power, wherein the first lens group includes one or more lenses having a negative refractive power, a reflector for changing an optical path, and one or more lenses having a positive refractive power, wherein, when zooming is performed from a wide angle position to a telephoto position, the first lens group, the third lens group and the fifth lens group remain fixed and the second lens group and the fourth lens group move, and wherein the zoom lens system satisfies Nd>1.94, where Nd represents an refractive index of the one or more lenses having a negative refractive power in the first lens group.

BRIEF DESCRIPTION OF THE DRAWINGS

The above and other features and advantages of the invention will become more apparent by describing in detail exemplary embodiments thereof with reference to the attached drawings in which:

FIG. 1 is a cross-sectional view of a zoom lens system according to a first embodiment of the invention;

FIGS. 3A through 3C are graphs showing lateral aberration respectively at a wide angle position, an intermediate position and a telephoto position of the zoom lens system illustrated in FIG. 1;

DETAILED DESCRIPTION

Figure 2A:
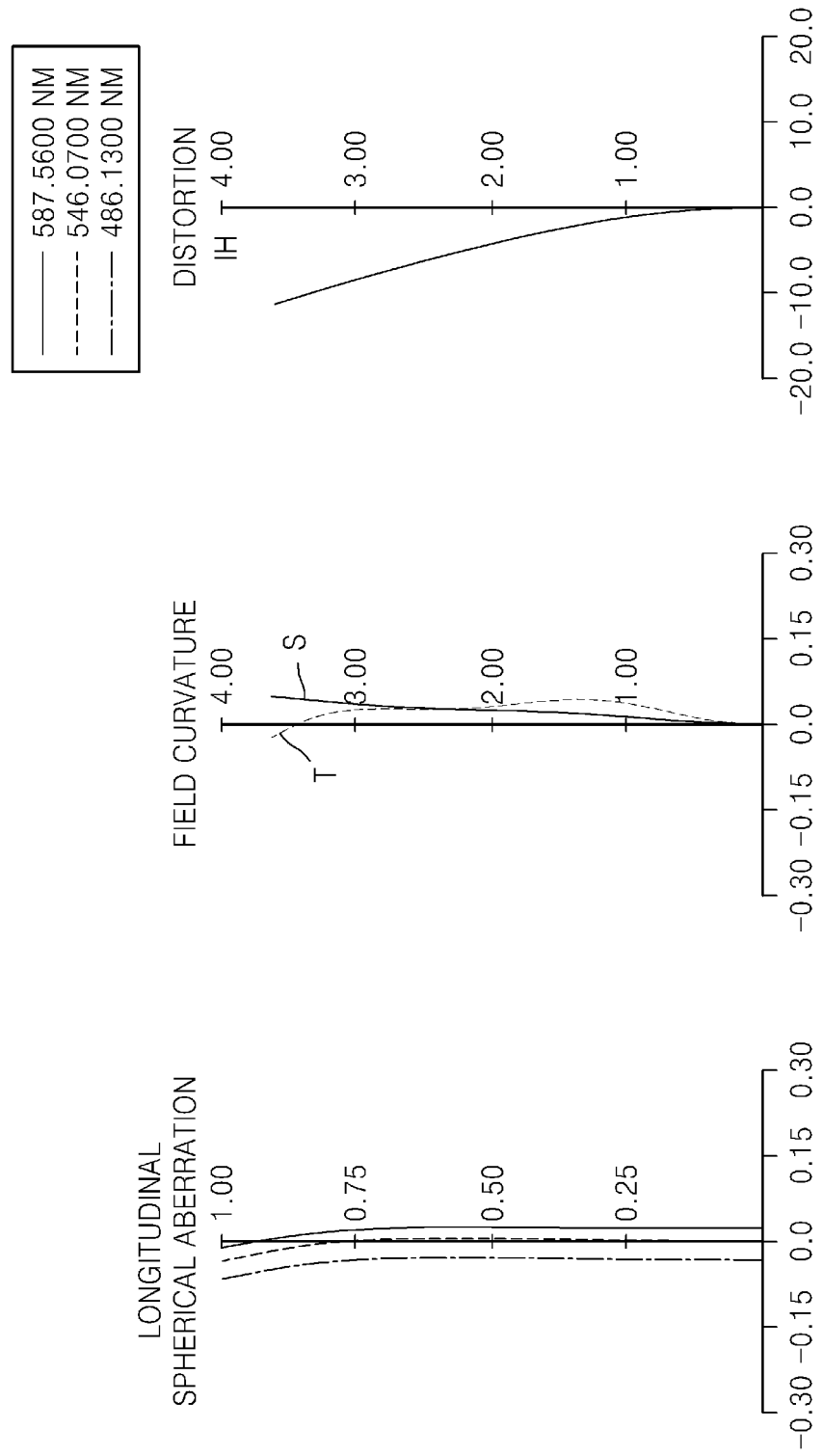
FIGS. 2A through 2C are graphs showing longitudinal spherical aberration, field curvature and distortion respectively at a wide angle position, an intermediate position and a telephoto position of the zoom lens system illustrated in FIG. 1.

Hereinafter, the invention will be described in detail by explaining embodiments of the invention with reference to the attached drawings.

A zoom lens system according to an embodiment of the invention may include five lens groups. The zoom lens system sequentially includes, from an object side to an image side, a first lens group having a positive refractive power, a second lens group having a negative refractive power, a third lens group having a positive refractive power, a fourth lens group having a positive refractive power, and a fifth lens group having a positive refractive power.

The first lens group includes at least one lens having a negative refractive power and the lens having a negative refractive power may be a high refractive lens having high magnification. When zooming is performed from a wide angle position to a telephoto position, the volume of a lens driving unit may be reduced by fixing a lens group that is the closest to the image side and thus the zoom lens system may have a small size.

FIG. 1 is a cross-sectional view illustrating a zoom lens system 100 according to a first embodiment of the invention.

Referring to FIG. 1, the zoom lens system 100 includes a first lens group G1 having a positive refractive power, a second lens group G2 having a negative refractive power, a third lens group G3 having a positive refractive power, a fourth lens group G4 having a positive refractive power, and a fifth lens group G5 having a positive refractive power, which are arranged along an optical axis in the order from an object side O to an image side I.

The first lens group G1 may include one or more lenses having a negative refractive power, a reflector for changing an optical path, and one or more lenses having a positive refractive power. For example, as illustrated in FIG. 1, the first lens group G1 may include a first lens 1, a reflector m, and a second lens 2. The first lens 1 may have a negative refractive power and the second lens 2 may have a positive refractive power. The first lens group G1 may satisfy Equation 1.

$$Nd > 1.94, \quad (1)$$

where Nd represents a refractive index of the one or more lenses having a negative refractive power in the first lens group G1. Since a high refractive lens is used as the first lens 1 having a negative refractive power as represented by Equation 1, a high zoom ratio may be achieved.

The reflector m folds an optical path to allow the zoom lens system 100 to efficiently use space. The reflector m may include, for example, a prism or a mirror.

The second lens group G2 may include, for example, a third lens 3, a fourth lens 4 and a fifth lens 5. The fourth lens 4 and the fifth lens 5 may form a doublet lens. The second lens group G2 may include at least one biconcave aspherical lens. Since a biconcave aspherical lens is used as the third lens 3, distortion and astigmatism may be reduced. The third lens group G3 may include a sixth lens 6, a seventh lens 7 and an eighth lens 8. The seventh lens 7 and the eighth lens 8 may form a doublet lens. The third lens group G3 may include a stop ST. The stop ST may be formed in the third lens group G3 toward the image side I, for example, on a lens surface that is the closest to the image side I in the third lens group G3.

The fourth lens group G4 may include a ninth lens 9, a tenth lens 10 and an eleventh lens 11, and the tenth lens 10 and the eleventh lens 11 may form a doublet lens. The fifth lens group G5 may include a twelfth lens 12. For example, the twelfth lens 12 may have a meniscus shape that is convex toward the image side I. The fifth lens group G5 may include only one lens having a positive refractive power. The fifth lens group G5 may include first and second filters 13 and 14 toward the image side I. Since a back focal length of the zoom lens system 100 is less than a focal length of a wide angle position, the zoom lens system 100 may have a small size.

When zooming is performed from a wide angle position to a telephoto position, the second lens group G2 and the fourth lens group G4 move, and the first lens group G1, the third lens group G3 and the fifth lens group G5 remain fixed. The second lens group G2 may move from the object side O to the image side I and the fourth lens group G4 may move from the image side I to the object side O. When zooming is performed, the distance between the second lens group G2 and the third lens group G3 is reduced and the distance between the third lens group G3 and the fourth lens group G4 is also reduced. In embodiments of the invention, when zooming is performed, the volume of a lens driving unit may be reduced by fixing a lens group that is closest to the image side I and thus a small size and low cost may be achieved.

Also, a zoom lens system according to an embodiment of the invention may satisfy Equation 2.

$$6.5 \leq Lt/L2 \leq 7.5, \quad (2)$$

where:

Lt represents an overall length of the zoom lens system at a telephoto position and L2 represents an amount of movement of a second lens group when zooming is performed from a wide angle position to the telephoto position.

If Lt/L2 is less than the lowest limit, high magnification greater than 3× magnification may not be easily achieved and, if Lt/L2 is greater than the highest limit, the zoom lens system may not easily have a small size and mechanical configuration of a lens driving unit may be difficult.

A zoom lens system according to an embodiment of the invention may satisfy Equation 3.

$$3.0 \leq F1/(Ft/Fw) \leq 3.9, \quad (3)$$

where

F1 represents a focal length of a first lens group,

Fw represents a focal length at a wide angle position of the zoom lens system, and Ft represents a focal length at a telephoto position of the zoom lens system.

Equation 3 represents a ratio between a zoom ratio (Ft/Fw) and the focal length of the first lens group and, if the range of Equation 3 is not satisfied, high magnification greater than 3× magnification may not be easily achieved or the zoom lens system may not easily have a small size.

Figure 2B:
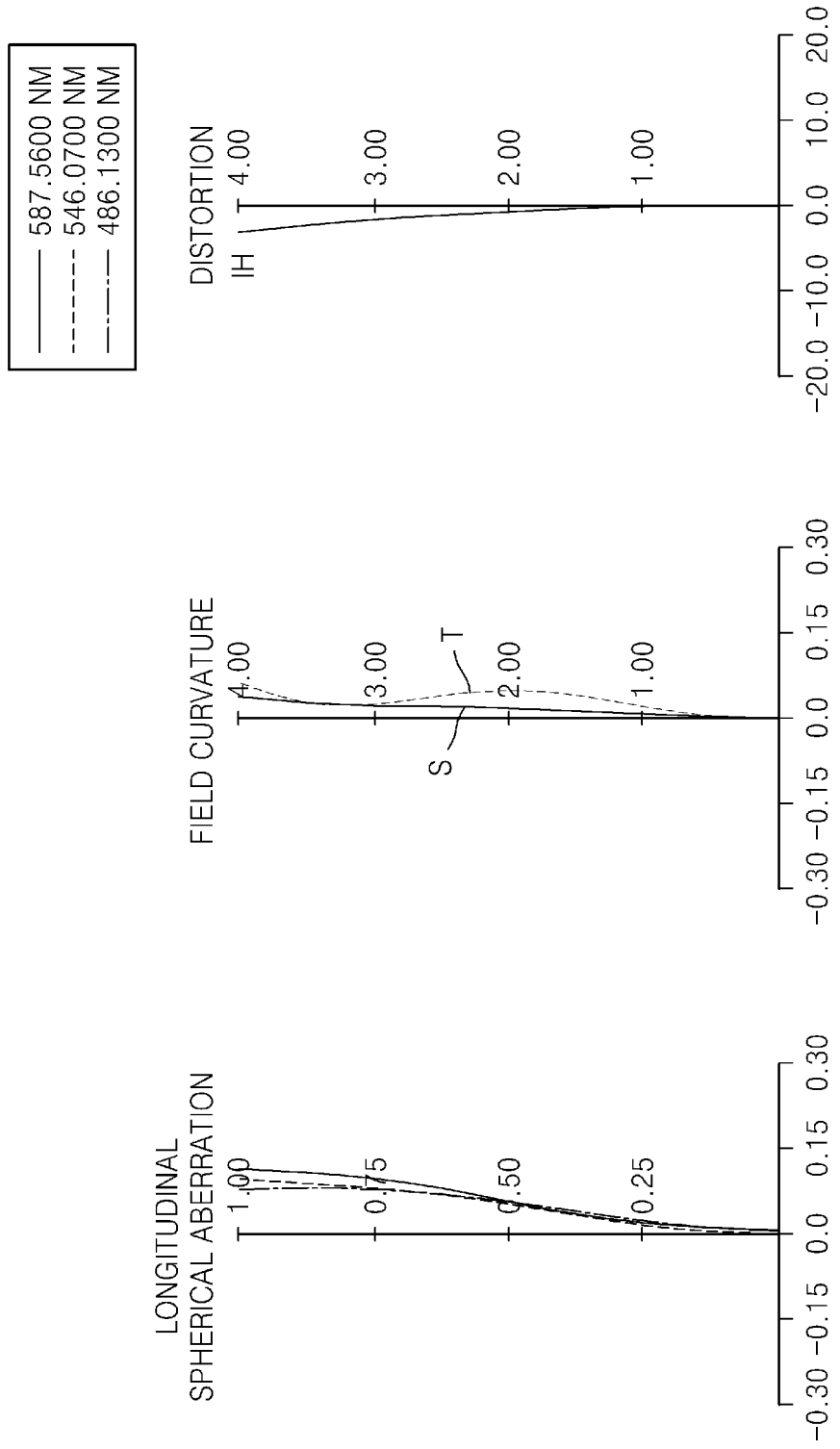
Figure 2C:
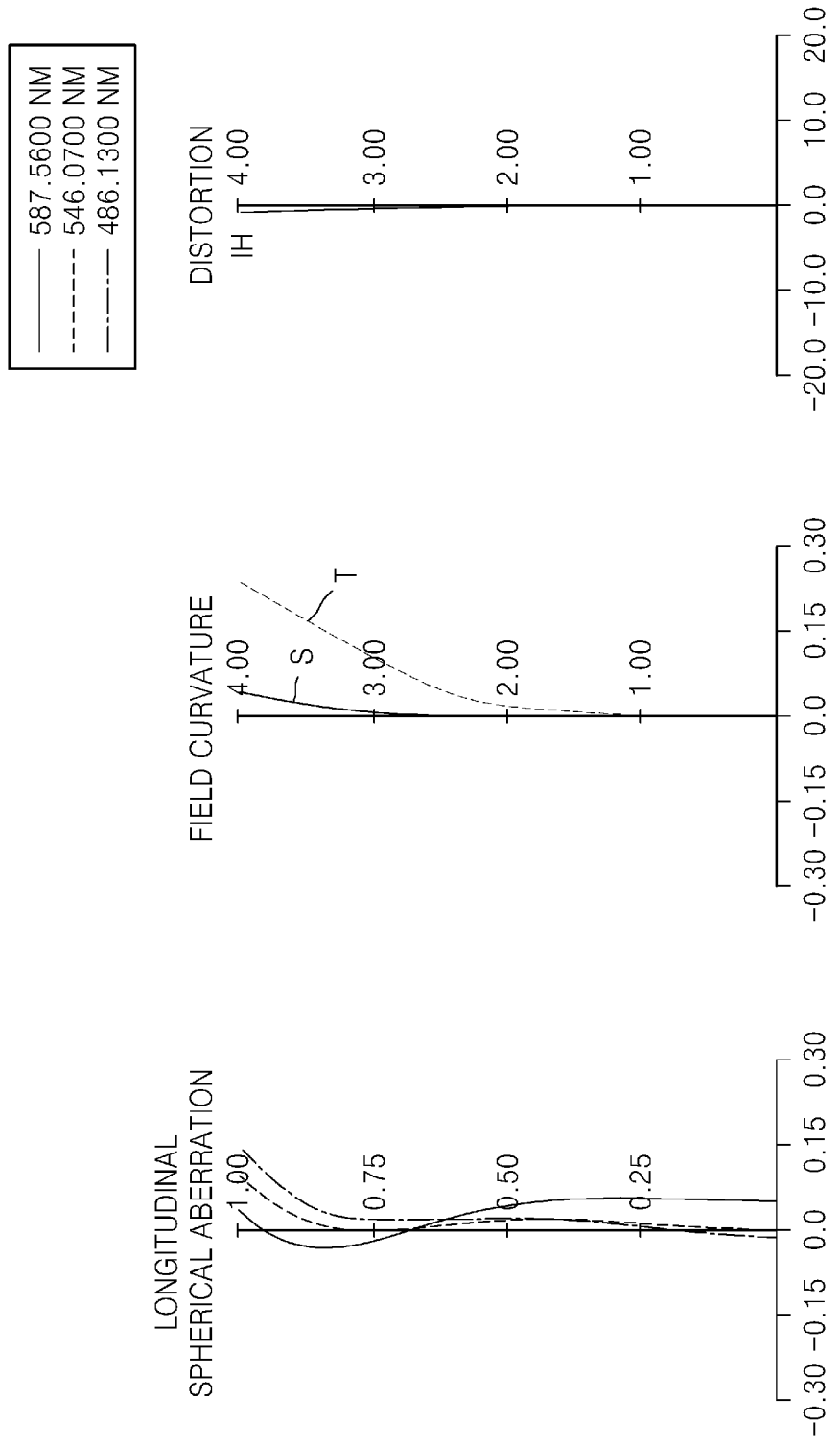

FIGS. 2A through 2C are graphs showing longitudinal spherical aberration, field curvature and distortion respectively at a wide angle position, an intermediate position, and a telephoto position of the zoom lens system illustrated in FIG. 1. The field curvature includes tangential field curvature T and sagittal field curvature S. In the graphs showing the distortion, a longitudinal axis represents an image height IH.

Figure 3A:
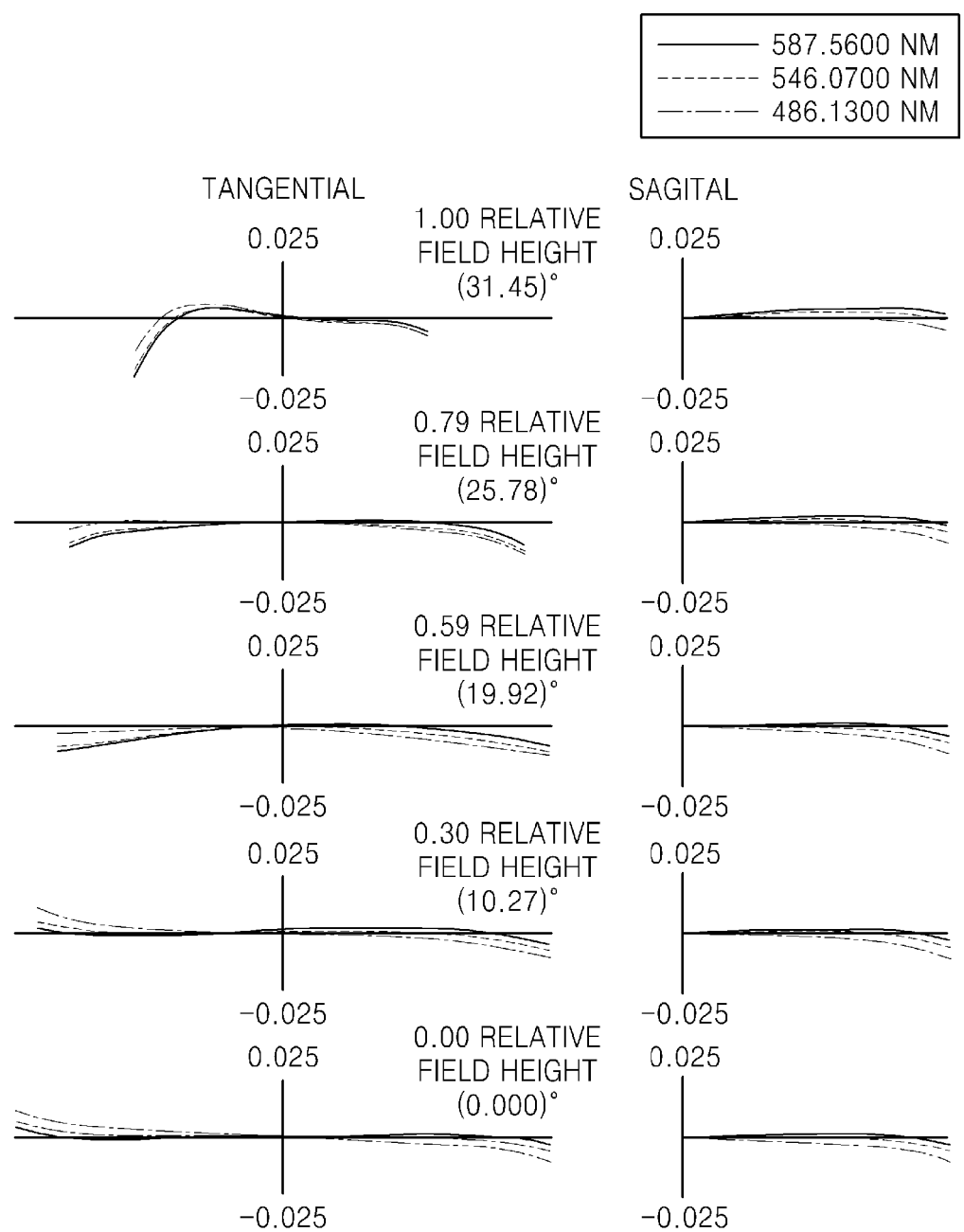
Figure 3B:
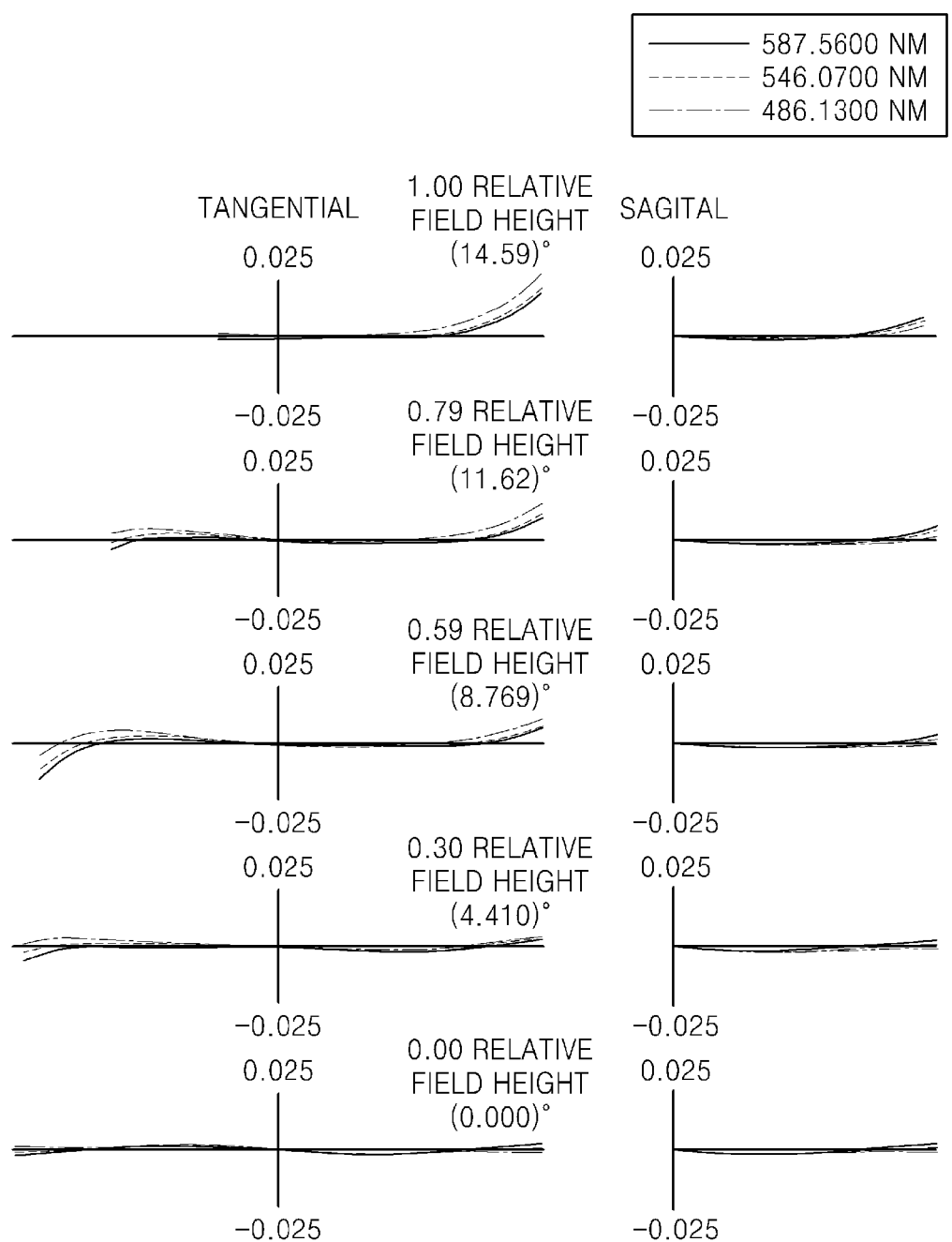

FIGS. 3A through 3C are graphs showing lateral aberration respectively at a wide angle position, an intermediate position and a telephoto position of the zoom lens system illustrated in FIG. 1.

Figure 4:
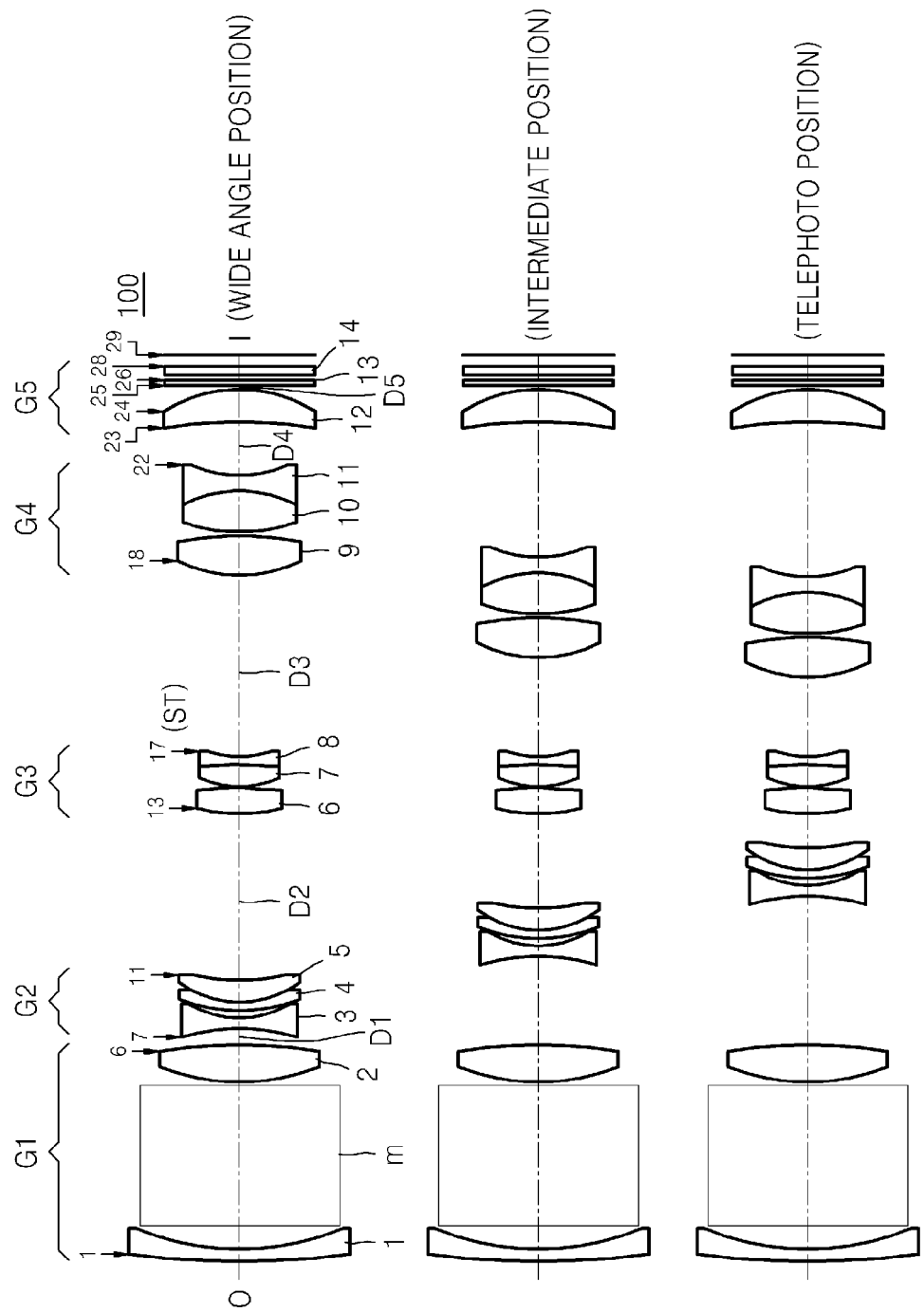
FIG. 4 is a cross-sectional view of a zoom lens system according to a second embodiment of the invention.

FIG. 4 is a cross-sectional view illustrating a zoom lens system 100 according to a second embodiment of the invention.

Referring to FIG. 4, the zoom lens system 100 according to the current embodiment includes the same number of lenses as the zoom lens system 100 illustrated in FIG. 1. Like reference numerals denote like elements in FIGS. 1 and 4 and thus detailed descriptions thereof will be omitted here.

Figure 5A:
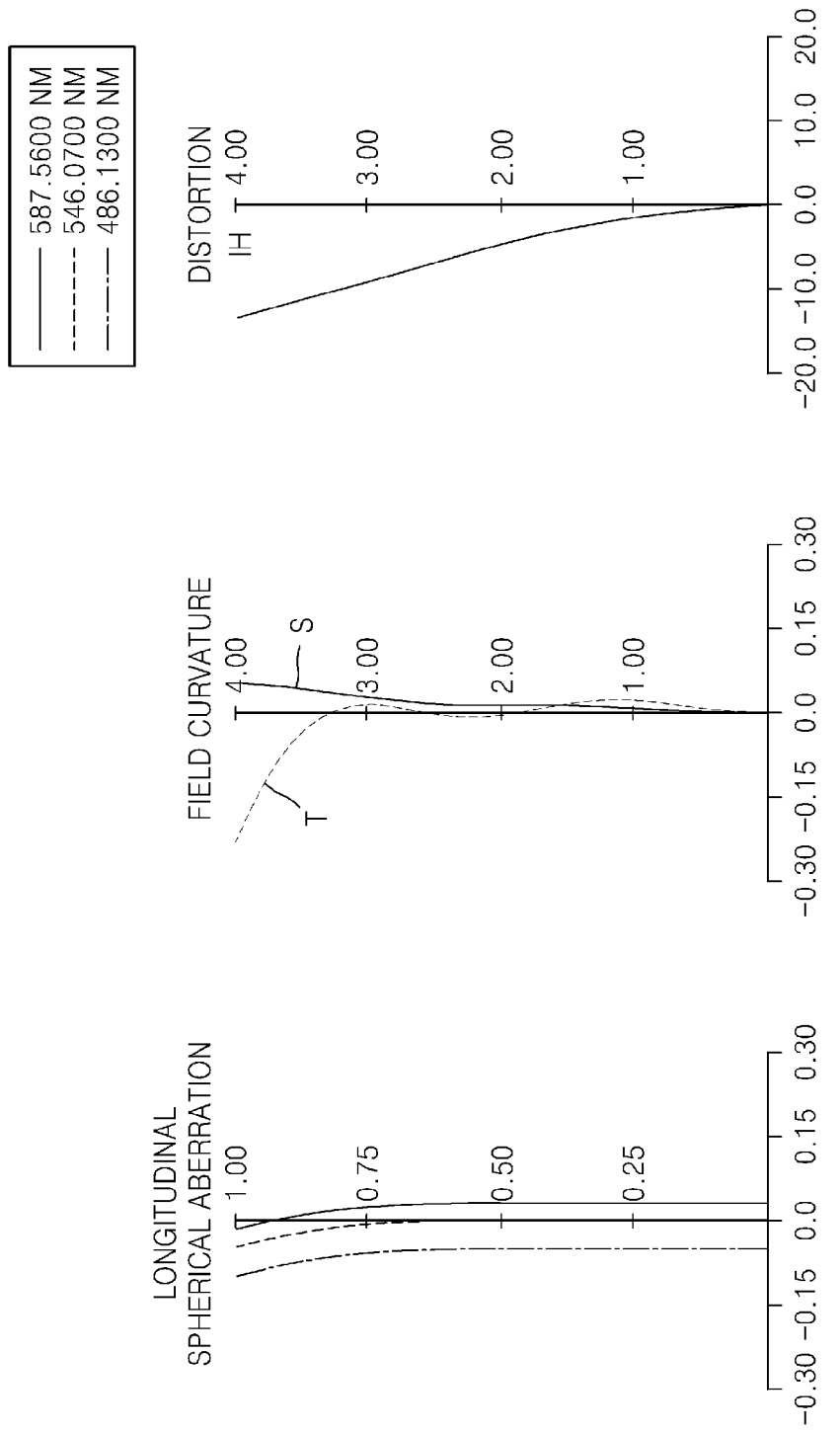
FIGS. 5A through 5C are graphs showing longitudinal spherical aberration, field curvature and distortion respectively at a wide angle position, an intermediate position and a telephoto position of the zoom lens system illustrated in FIG. 4.
Figure 5B:
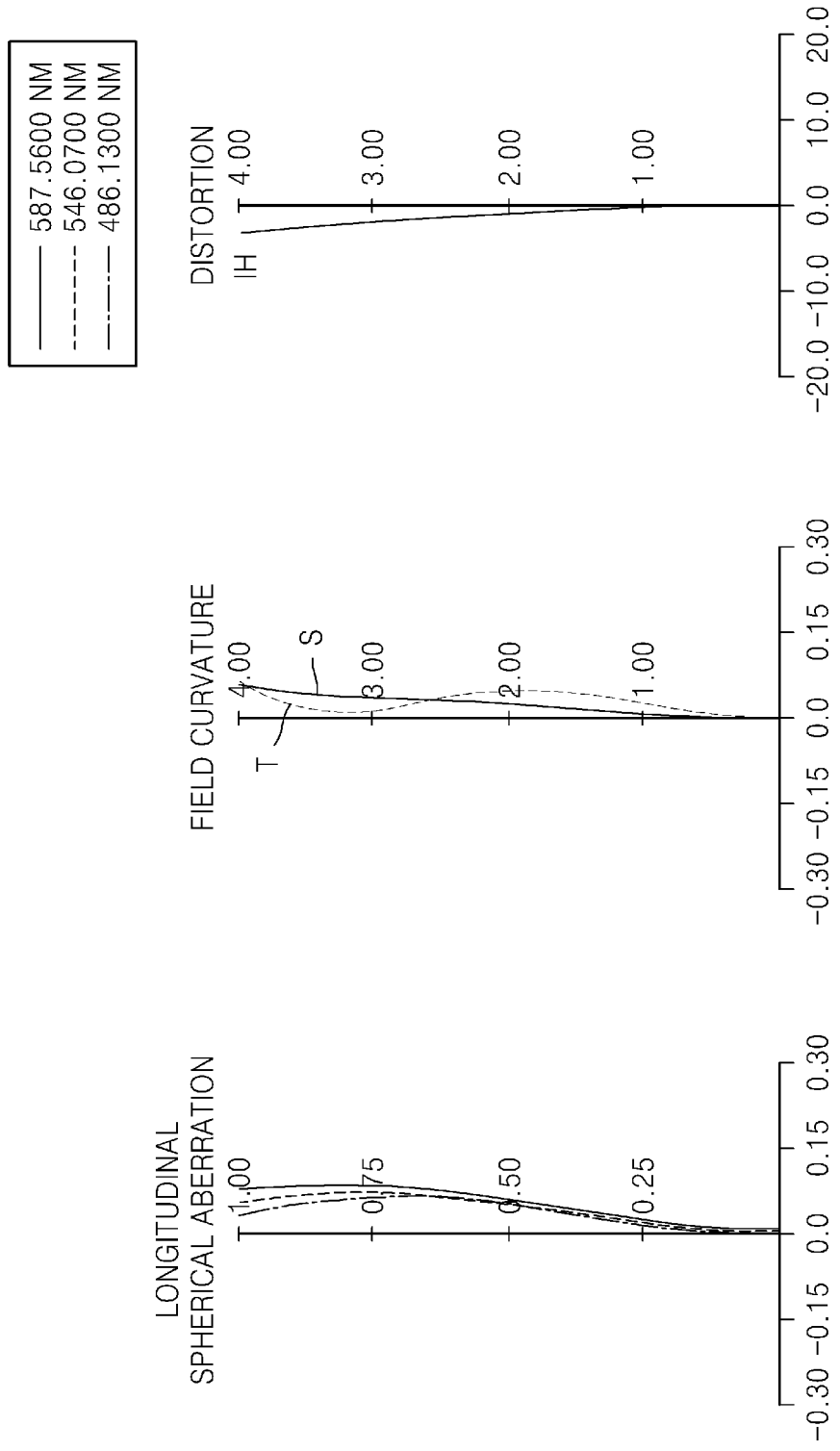
Figure 5C:
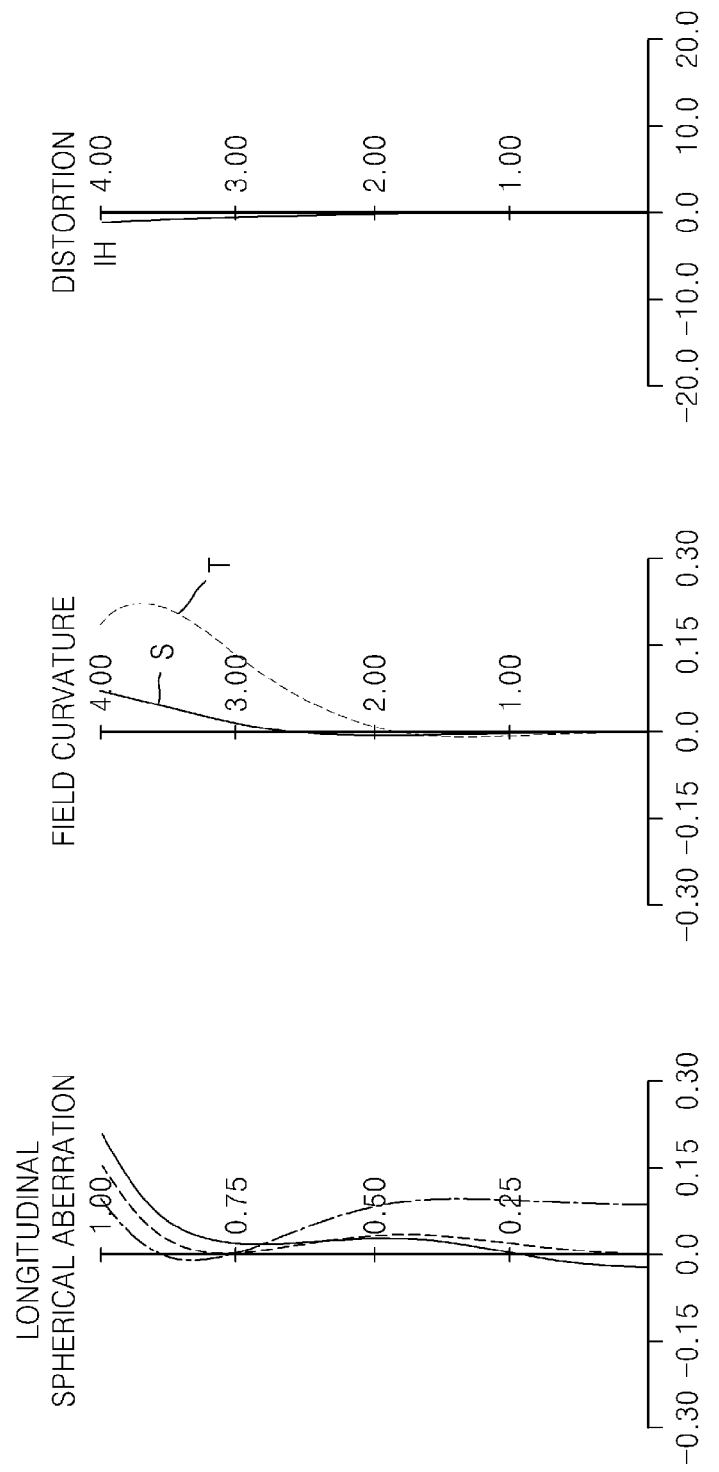

FIGS. 5A through 5C are graphs showing longitudinal spherical aberration, field curvature and distortion respectively at a wide angle position, an intermediate position, and a telephoto position of the zoom lens system illustrated in FIG. 4.

Figure 6:
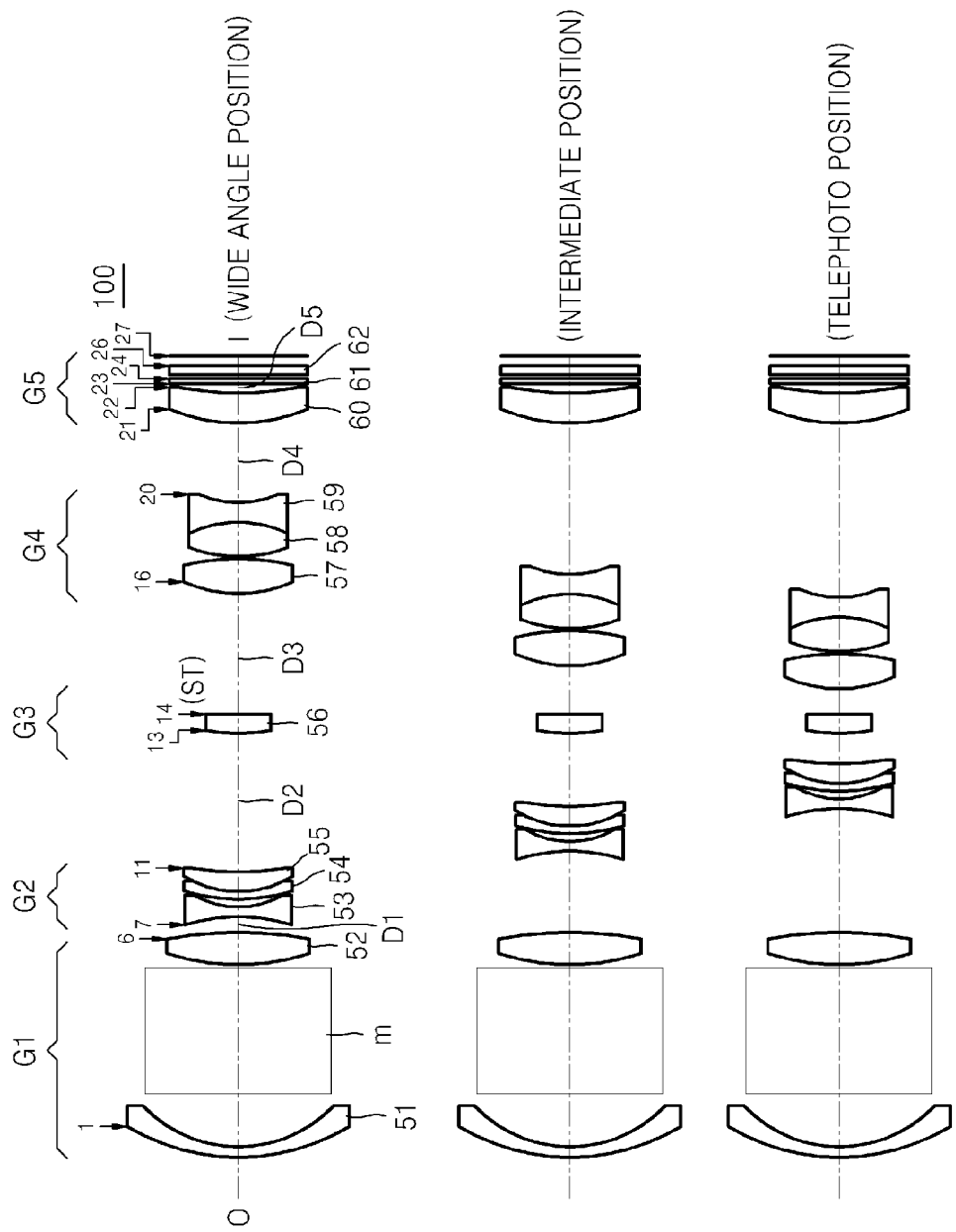
FIG. 6 is a cross-sectional view of a zoom lens system according to a third embodiment of the invention.

FIG. 6 is a cross-sectional view illustrating a zoom lens system 100 according to a third embodiment of the invention.

Referring to FIG. 6, in the zoom lens system 100, a first lens group G1 includes two lenses 51 and 52 and a reflector m, and a second lens group G2 includes three lenses 53, 54 and 55. The lens 51 may have a refractive index that satisfies Equation 1 and the second lens group G2 may include a doublet lens. A third lens group G3 may include one lens 56. The third lens group G3 may include a stop ST toward an image side I, for example, on an image side surface of the lens 56. The lens 56 may be an aspherical lens. A fourth lens group G4 includes three lenses 57, 58 and 59 and may include a doublet lens. A fifth lens group G5 includes one lens 60 and may include first and second filters 61 and 62 toward the image side I from the lens 60. When the zoom lens system 100 according to the current embodiment is compared to the zoom lens system 100 illustrated in FIG. 1, a difference exists in that the third lens group G3 includes one lens 56 in FIG. 6 and the other lens groups are the same.

Figure 7A:
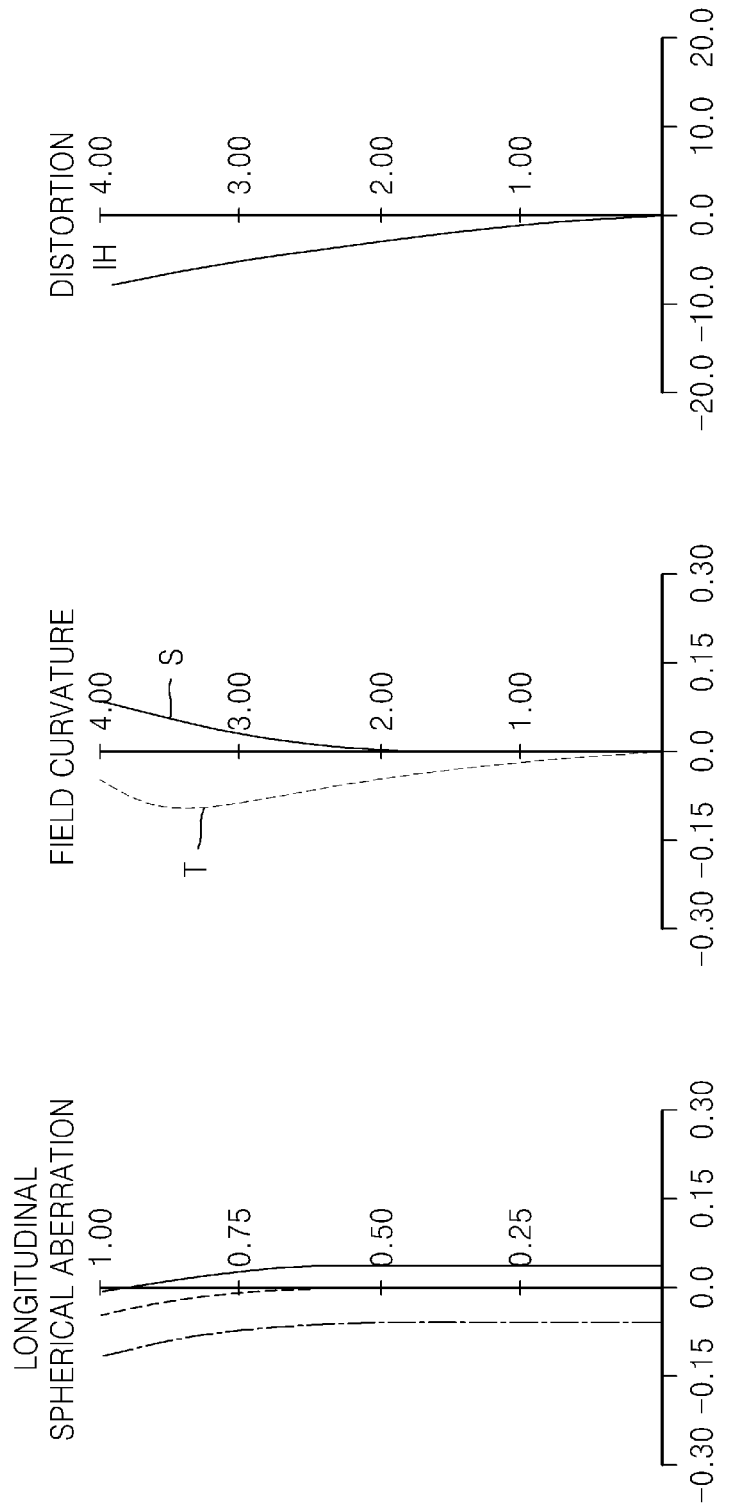
FIGS. 7A through 7C are graphs showing longitudinal spherical aberration, field curvature and distortion respectively at a wide angle position, an intermediate position and a telephoto position of the zoom lens system illustrated in FIG. 6.
Figure 7B:
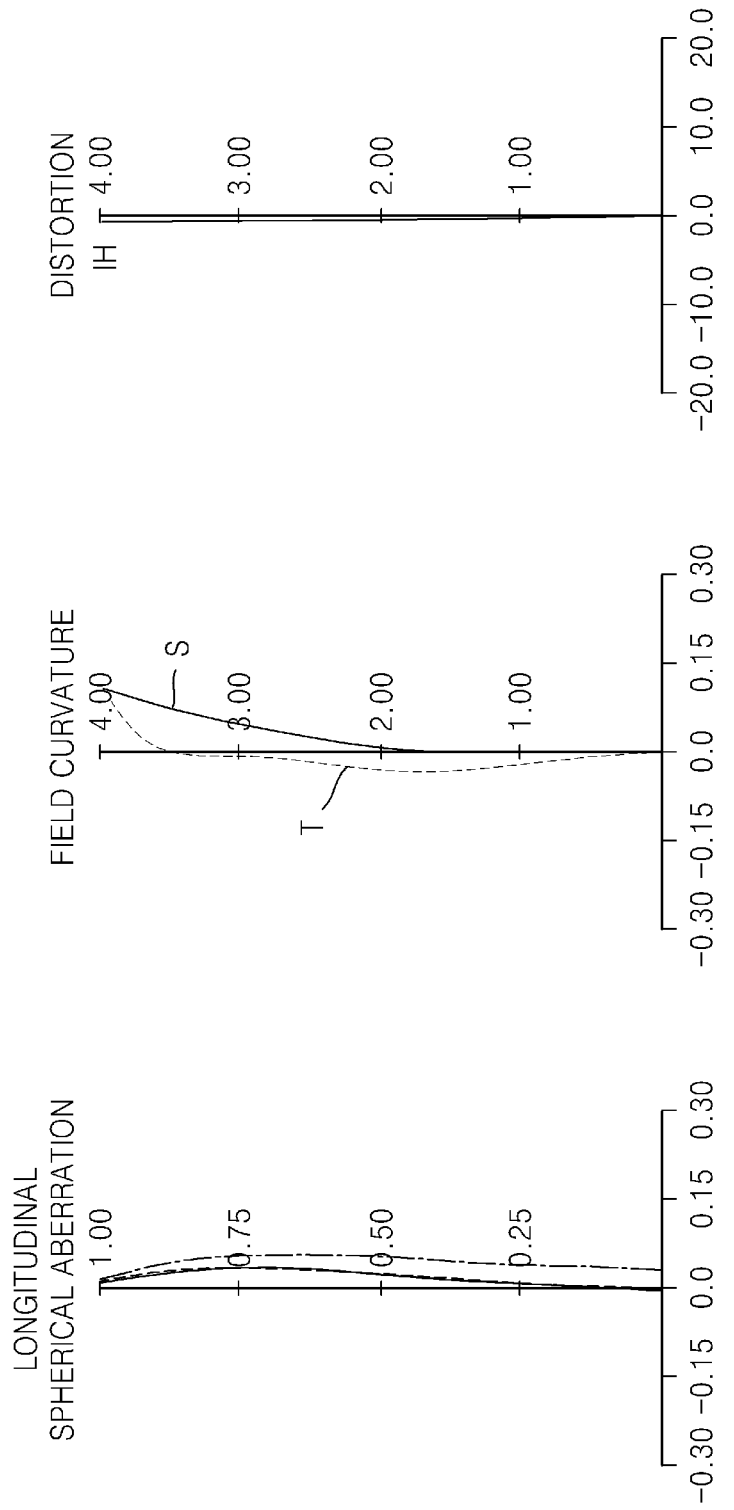
Figure 7C:
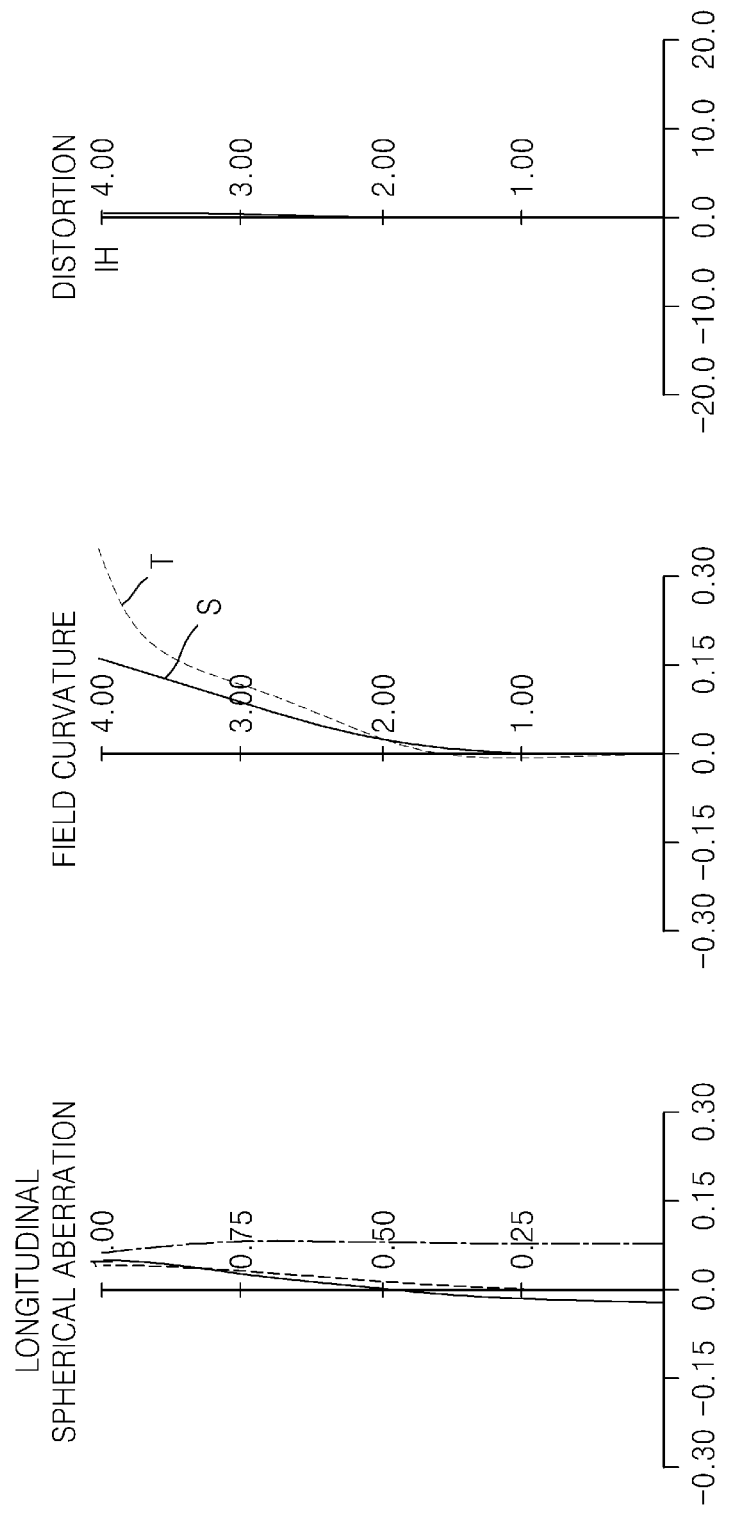

FIGS. 7A through 7C are graphs showing longitudinal spherical aberration, field curvature and distortion respectively at a wide angle position, an intermediate position and a telephoto position of the zoom lens system illustrated in FIG. 6.

Figure 8:
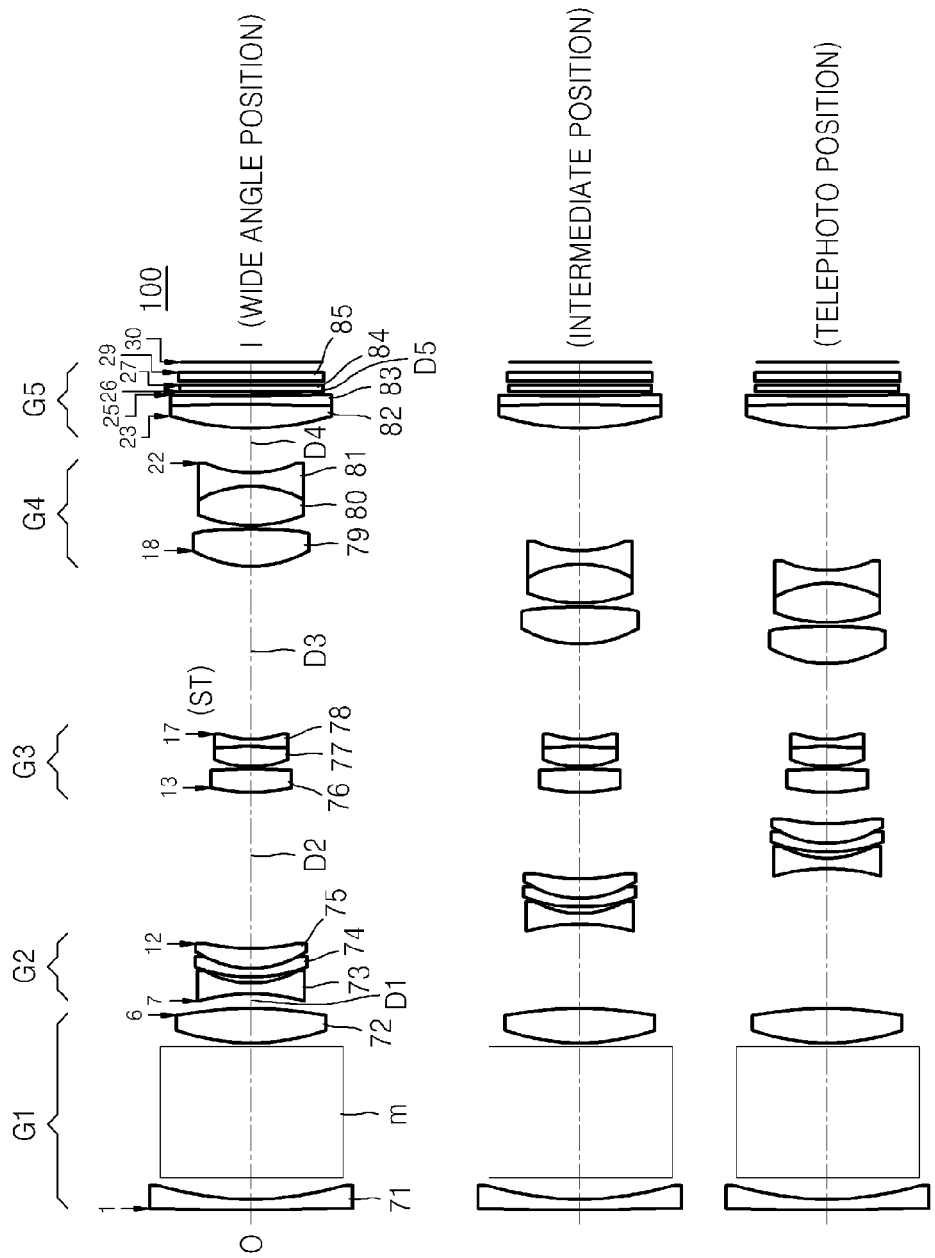
FIG. 8 is a cross-sectional view of a zoom lens system according to a fourth embodiment of the invention.

FIG. 8 is a cross-sectional view illustrating a zoom lens system 100 according to a fourth embodiment of the invention.

Referring to FIG. 8, the zoom lens system 100 according to the current embodiment is different from the zoom lens system 100 illustrated in FIG. 1 in that a fifth lens group G5 includes two lenses 82 and 83 in FIG. 8. A first lens group G1 may include a first lens 71, a reflector m and a second lens 72, a second lens group G2 may include a third lens 72, a fourth lens 73 and a fifth lens 74, a third lens group G3 may include a sixth lens 76, a seventh lens 77 and an eighth lens 78, and a fourth lens group G4 may include a ninth lens 79, a tenth lens 80 and an eleventh lens 81. The fifth lens group G5 may include first and second filters 84 and 85 toward an image side I.

Figure 9A:
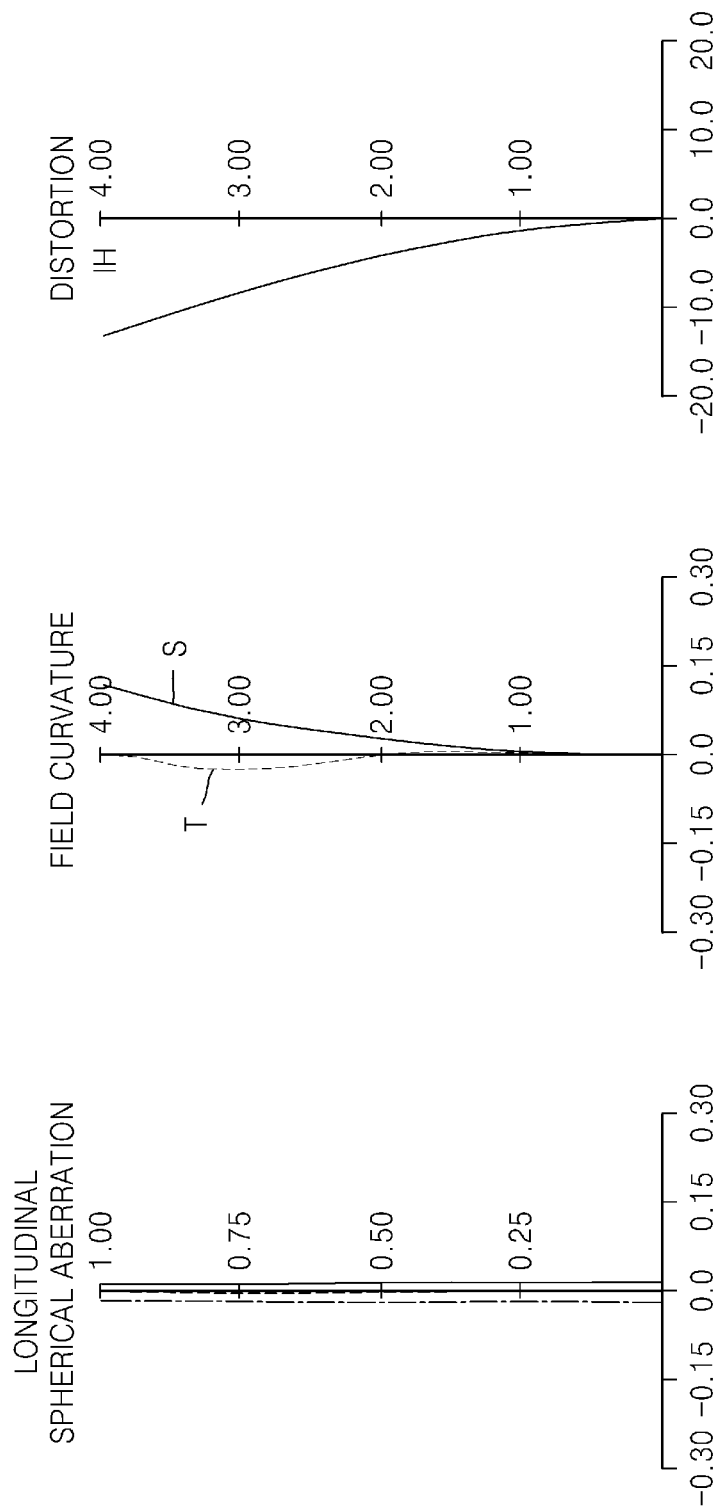
FIGS. 9A through 9C are graphs showing longitudinal spherical aberration, field curvature and distortion respectively at a wide angle position, an intermediate position and a telephoto position of the zoom lens system illustrated in FIG. 8.
Figure 9B:
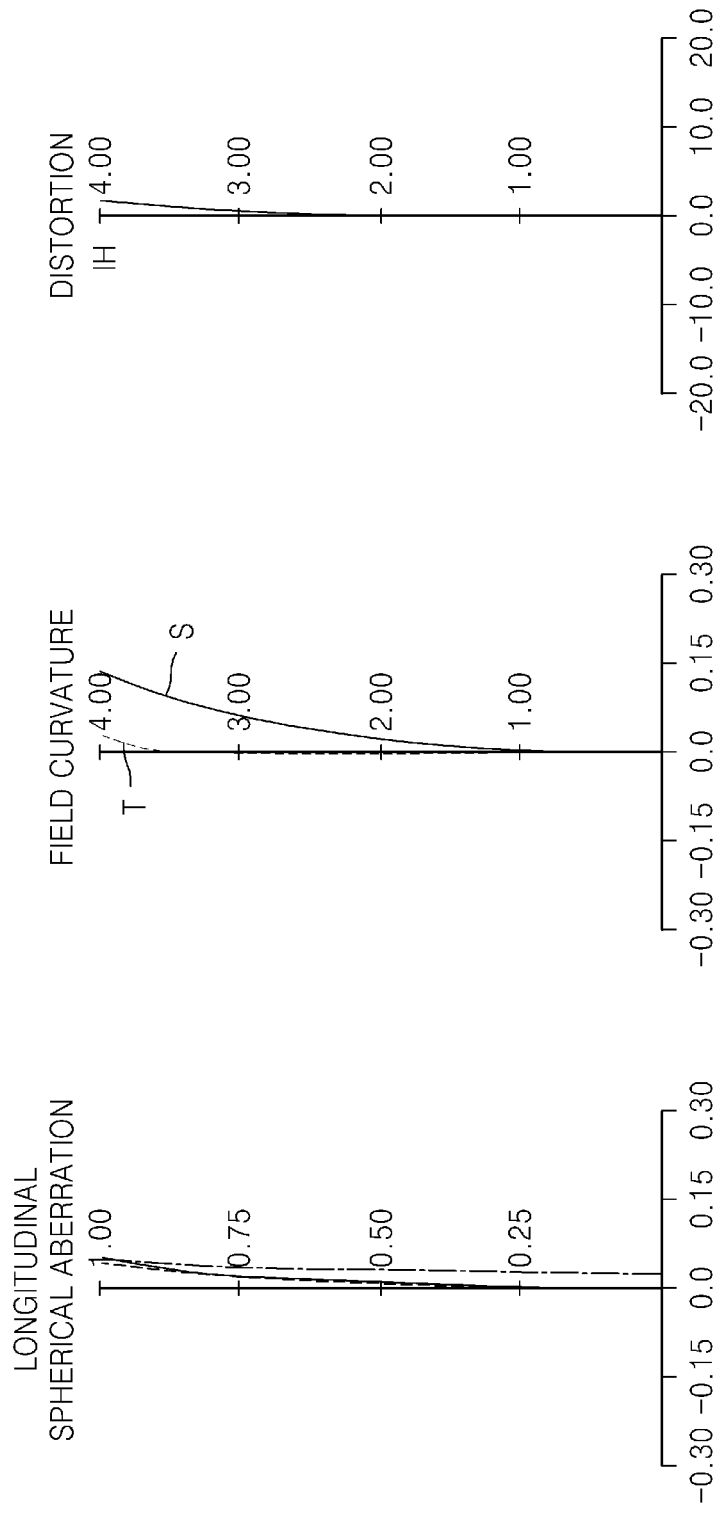
Figure 9C:
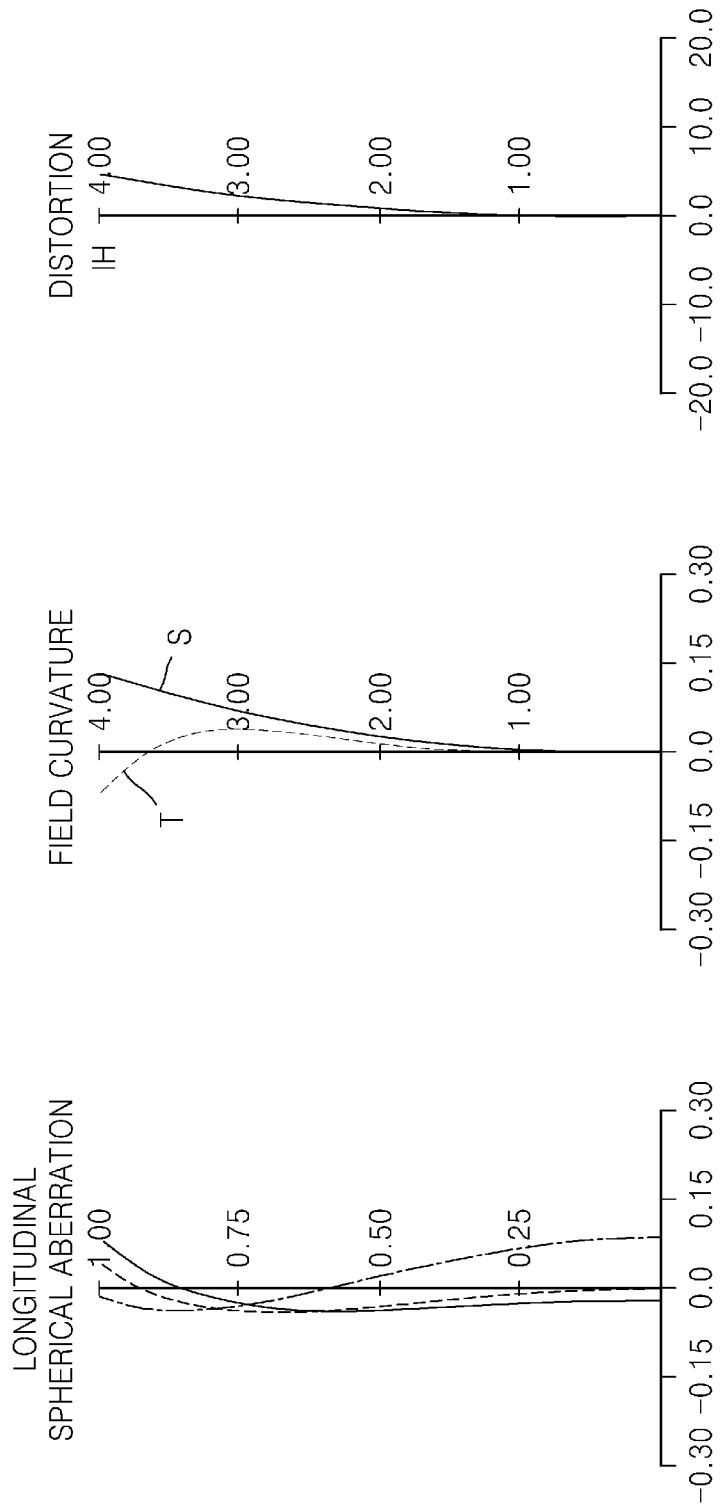

FIGS. 9A through 9C are graphs showing longitudinal spherical aberration, field curvature and distortion respectively at a wide angle position, an intermediate position, and a telephoto position of the zoom lens system illustrated in FIG. 8.

An aspherical surface is defined as described below.

When an optical axis direction is an x axis direction, a direction perpendicular to the optical axis direction is a y axis direction, and a light proceeding direction is a positive direction, an aspherical shape of a zoom lens system according to an embodiment of the invention may be represented by Equation 4. In Equation 4, x represents a distance from a vertex of a lens in the optical axis direction, y represents a distance in the direction perpendicular to the optical axis direction, K represents a conic constant, A, B, C and D represent aspherical coefficients, and c represents an inverse number of a vertex radius of curvature (1/R).

$$x = \frac{cy^2}{1 + \sqrt{1 - (K+1)c^2 y^2}} + Ay^4 + By^6 + Cy^8 + Dy^{10} \quad (4)$$

Design data of the zoom lens system 100 according to first through fourth embodiments of the invention will now be described.

Hereinafter, f represents an effective focal length (EFL) of the whole zoom lens system 100, Fno represents an F number, ω represents a half-field angle, R represents a radius of curvature, Dn represents a central thickness of a lens or a distance between lenses, Nd represents a refractive index, Vd represents an Abbe number, ST represents a stop, D1, D2, D3 and D4 represent variable distances, and ASP represents an aspherical surface.

First Embodiment

FIG. 1 illustrates the zoom lens system 100 according to the first embodiment of the invention.

Design data of the first embodiment of the invention is as represented below in Table 1.

TABLE 1

| Lens Surface | R | Dn | Nd | Vd |
|---|---|---|---|---|
| OBJECT | INFINITY | D0 | | |
| S1 | 109.968 | 0.60 | 1.944509 | 18.2440 |
| S2 | 16.727 | 1.09 | | |
| S3 | INFINITY | 7.60 | 1.834001 | 37.3451 |
| S4 | INFINITY | 0.20 | | |
| S5 | 10.794 | 2.02 | 1.715376 | 53.6409 |
| S6 | −27.343 | D1 | | |
| S7 | −9.003 | 0.60 | 1.851348 | 40.1045 |
| S8 | 5.411 | 0.41 | | |
| S9 | 9.614 | 0.45 | 1.502411 | 68.8115 |
| S10 | 5.547 | 1.21 | 1.945945 | 17.9843 |
| S11 | 14.418 | D2 | | |
| S12 | INFINITY | 0.30 | | |
| S13 | 8.085 | 1.41 | 1.843155 | 40.2115 |
| S14 | −29.789 | 0.10 | | |
| S15 | 5.233 | 1.17 | 1.545552 | 63.9776 |
| S16 | −32.993 | 0.40 | 1.909583 | 30.8317 |
| S17(ST) | 4.806 | D3 | | |
| S18 | 6.647 | 2.14 | 1.611207 | 60.8045 |
| S19 | −18.265 | 0.12 | | |
| S20 | 8.943 | 2.23 | 1.495721 | 69.5055 |
| S21 | −6.143 | 0.58 | 1.891174 | 35.9773 |
| S22 | 6.041 | D4 | | |
| S23 | −29.015 | 1.75 | 1.538944 | 46.0098 |
| S24 | −7.563 | D5 | | |
| S25 | INFINITY | 0.30 | 1.516798 | 64.1983 |
| S26 | INFINITY | 0.30 | | |
| S27 | INFINITY | 0.50 | 1.516798 | 64.1983 |
| S28 | INFINITY | D6 | | |
| S29 | IMG | | | |

Aspherical coefficients are as represented below in Table 2.

TABLE 2

| Lens Surface | K | A | B | C | D |
|---|---|---|---|---|---|
| S5 | −1.00000 | 8.576077e−006 | 9.786148e−007 | 1.668350e−008 | 0.000000e+000 |
| S6 | −1.00000 | 3.972342e−005 | 1.767054e−006 | −1.218841e−008 | 0.000000e+000 |
| S7 | −0.59723 | 1.372863e−003 | −1.340997e−004 | 1.590211e−005 | −6.648233e−007 |
| S8 | −0.23739 | 6.830944e−004 | −2.036574e−004 | 3.301372e−005 | −1.631000e−006 |
| S13 | −0.05733 | −2.379939e−004 | 0.000000e+000 | 0.000000e+000 | 0.000000e+000 |
| S14 | −1.00000 | −8.239195e−005 | 0.000000e+000 | 0.000000e+000 | 0.000000e+000 |
| S18 | 0.85024 | −6.550695e−004 | −1.215594e−006 | −1.020260e−006 | 0.000000e+000 |

Data regarding variable distances when zooming is performed is as represented below in Table 3.

TABLE 3

| | Wide Angle Position | Intermediate Position | Telephoto Position |
|---|---|---|---|
| EFL | 6.541 | 15.364 | 26.165 |
| ω | 31.446 | 14.593 | 8.692 |
| Fno | 3.810 | 4.966 | 5.265 |
| D1 | 0.900 | 5.083 | 7.755 |
| D2 | 8.355 | 4.172 | 1.500 |
| D3 | 9.044 | 4.662 | 3.755 |
| D4 | 2.682 | 7.064 | 7.971 |
| D5 | 0.210 | 0.210 | 0.210 |

Second Embodiment

FIG. 4 illustrates the zoom lens system 100 according to the second embodiment of the invention.

Design data of the second embodiment of the invention is as represented below in Table 4.

TABLE 4

| Lens Surface | R | Dn | Nd | Vd |
|---|---|---|---|---|
| OBJECT | INFINITY | D0 | | |
| S1 | 48.868 | 0.60 | 1.946106 | 18.0007 |
| S2 | 14.020 | 1.31 | | |
| S3 | INFINITY | 7.60 | 1.834001 | 37.3451 |
| S4 | INFINITY | 0.20 | | |
| S5 | 11.099 | 2.03 | 1.716023 | 53.5604 |
| S6 | −24.913 | D1 | | |
| S7 | −8.651 | 0.60 | 1.851348 | 40.1045 |
| S8 | 5.382 | 0.38 | | |
| S9 | 8.809 | 0.45 | 1.516249 | 67.4735 |
| S10 | 5.454 | 1.20 | 1.944950 | 18.0898 |
| S11 | 13.267 | D2 | | |
| S12 | INFINITY | 0.30 | | |
| S13 | 8.337 | 1.40 | 1.840201 | 40.2507 |
| S14 | −27.925 | 0.10 | | |
| S15 | 5.280 | 1.17 | 1.543824 | 51.0616 |
| S16 | −28.972 | 0.40 | 1.911910 | 30.6568 |
| S17(ST) | 4.872 | D3 | | |
| S18 | 6.754 | 2.18 | 1.611596 | 60.7837 |
| S19 | −16.595 | 0.17 | | |

TABLE 4-continued

| Lens Surface | R | Dn | Nd | Vd |
|---|---|---|---|---|
| S20 | 8.967 | 2.27 | 1.495969 | 69.4792 |
| S21 | −6.074 | 0.81 | 1.894740 | 33.4683 |
| S22 | 5.902 | D4 | | |
| S23 | −26.170 | 1.75 | 1.592703 | 35.4456 |
| S24 | −7.618 | D5 | | |
| S25 | INFINITY | 0.30 | 1.516798 | 64.1983 |
| S26 | INFINITY | 0.30 | | |
| S27 | INFINITY | 0.50 | 1.516798 | 64.1983 |

Aspherical coefficients are as represented below in Table 5.

TABLE 5

| Lens Surface | K | A | B | C | D |
|---|---|---|---|---|---|
| S5 | −1.00000 | 1.822923e−007 | 1.098545e−006 | 1.924242e−008 | 0.000000e+000 |
| S6 | −1.00000 | 2.684352e−005 | 2.200812e−006 | −1.752627e−008 | 0.000000e+000 |
| S7 | 1.62677 | 1.706582e−003 | −1.626158e−004 | 2.364960e−005 | −1.013234e−006 |
| S8 | −0.72397 | 1.000443e−003 | −2.750855e−004 | 5.016811e−005 | −2.546709e−006 |
| S13 | 0.07525 | −2.001639e−004 | 0.000000e+000 | 0.000000e+000 | 0.000000e+000 |
| S14 | −1.00000 | −3.866202e−005 | 0.000000e+000 | 0.000000e+000 | 0.000000e+000 |
| S18 | 0.85186 | −6.087489e−004 | −2.659249e−006 | −8.949211e−007 | 0.000000e+000 |

Data regarding variable distances when zooming is performed is as represented below in Table 6.

TABLE 6

|  | Wide Angle Position | Intermediate Position | Telephoto Position |
|---|---|---|---|
| EFL | 6.408 | 14.772 | 28.836 |
| Ω | 31.973 | 15.151 | 7.897 |
| Fno | 3.934 | 5.173 | 5.521 |
| D1 | 0.900 | 4.849 | 8.142 |
| D2 | 8.742 | 4.793 | 1.500 |
| D3 | 9.896 | 5.421 | 4.448 |
| D4 | 2.929 | 7.405 | 8.377 |
| D5 | 0.210 | 0.210 | 0.210 |

Third Embodiment

FIG. 6 illustrates the zoom lens system 100 according to the third embodiment of the invention.

Design data of the third embodiment of the invention is as represented below in Table 7.

TABLE 7

| Lens Surface | R | Dn | Nd | Vd |
|---|---|---|---|---|
| OBJECT | INFINITY | D0 | | |
| S1 | 12.752 | 0.60 | 2.0030 | 19.300 |
| S2 | 7.777 | 3.16 | | |
| S3 | INFINITY | 7.60 | 1.834001 | 37.3451 |
| S4 | INFINITY | 0.20 | | |
| S5 | 12.937 | 1.98 | 1.725760 | 52.2960 |
| S6 | −20.966 | D1 | | |
| S7 | −8.674 | 0.60 | 1.846125 | 39.2184 |
| S8 | 5.347 | 0.46 | | |
| S9 | 10.773 | 0.45 | 1.501269 | 62.8391 |
| S10 | 6.015 | 1.19 | 1.951672 | 22.6070 |
| S11 | 17.850 | D2 | | |
| S12 | INFINITY | 0.30 | | |
| S13 | 13.282 | 1.16 | 1.806100 | 40.7306 |
| S14(ST) | −78.608 | 0.00 | | |
| S15 | INFINITY | D3 | | |

TABLE 7-continued

| Lens Surface | R | Dn | Nd | Vd |
|---|---|---|---|---|
| S16 | 8.121 | 2.07 | 1.607250 | 61.0181 |
| S17 | −13.581 | 0.10 | | |
| S18 | 8.236 | 2.13 | 1.502105 | 68.8426 |
| S19 | −5.933 | 1.13 | 1.904270 | 27.4101 |
| S20 | 5.894 | D4 | | |
| S21 | 10.930 | 1.75 | 1.592703 | 35.4456 |
| S22 | 16.606 | D5 | | |
| S23 | INFINITY | 0.30 | 1.516798 | 64.1983 |
| S24 | INFINITY | 0.30 | | |
| S25 | INFINITY | 0.50 | 1.516798 | 64.1983 |
| S26 | INFINITY | | | |

Aspherical coefficients are as represented below in Table 8.

TABLE 8

| Lens Surface | K | A | B | C | D |
|---|---|---|---|---|---|
| S5 | −1.00000 | 3.932819e−005 | −1.073800e−006 | 1.932096e−008 | 0.000000e+000 |
| S6 | −1.00000 | 2.641270e−005 | −1.506708e−006 | 2.996461e−008 | 0.000000e+000 |
| S7 | −19.71026 | −1.613118e−003 | 1.559503e−004 | −9.683896e−006 | 2.480005e−007 |
| S8 | 1.45545 | −4.464937e−004 | −2.918871e−004 | 2.484136e−005 | −2.445739e−006 |
| S13 | −0.14515 | −8.080538e−005 | 0.000000e−005 | 0.000000e+000 | 0.000000e+000 |
| S14 | −1.00000 | 5.693110e−005 | 0.000000e+000 | 0.000000e+000 | 0.000000e+000 |
| S16 | 2.30365 | −6.614458e−004 | −3.340318e−006 | −1.584758e−006 | 0.000000e+000 |
| S22 | −1.00000 | −7.912026e−004 | 1.069748e−004 | −8.748654e−006 | 2.148328e−007 |

Data regarding variable distances when zooming is performed is as represented below in Table 9.

TABLE 9

|  | Wide Angle Position | Intermediate Position | Telephoto Position |
|---|---|---|---|
| EFL | 5.853 | 13.385 | 22.534 |
| ω | 34.349 | 16.638 | 10.066 |
| Fno | 4.186 | 5.323 | 5.754 |
| D1 | 0.900 | 4.945 | 7.451 |
| D2 | 8.051 | 4.006 | 1.500 |
| D3 | 7.254 | 2.970 | 1.614 |
| D4 | 4.803 | 9.087 | 10.443 |
| D5 | 0.547 | 0.547 | 0.547 |

Fourth Embodiment

FIG. 8 illustrates the zoom lens system 100 according to the fourth embodiment of the invention.

Design data of the fourth embodiment of the invention is represented below in table 10.

TABLE 10

| Lens Surface | R | Dn | Nd | Vd |
|---|---|---|---|---|
| OBJECT | INFINITY | D0 | | |
| S1 | 198.093 | 0.60 | 1.949357 | 18.4103 |
| S2 | 17.894 | 1.27 | | |
| S3 | INFINITY | 7.60 | 1.834001 | 37.3451 |
| S4 | INFINITY | 0.20 | | |
| S5 | 11.779 | 2.01 | 1.716440 | 53.5093 |
| S6 | −22.035 | D1 | | |
| S7 | −8.859 | 0.60 | 1.851348 | 40.1045 |
| S8 | 5.310 | 0.37 | | |
| S9 | 8.846 | 0.45 | 1.515494 | 67.5434 |
| S10 | 5.451 | 1.20 | 1.945945 | 17.9843 |
| S11 | 13.330 | D2 | | |
| S12 | INFINITY | 0.30 | | |
| S13 | 8.271 | 1.40 | 1.840213 | 40.2506 |
| S14 | −28.450 | 0.10 | | |
| S15 | 5.360 | 1.19 | 1.543872 | 63.3868 |
| S16 | −27.018 | 0.40 | 1.912084 | 30.6434 |
| S17(ST) | 4.938 | D3 | | |
| S18 | 6.594 | 2.20 | 1.611416 | 60.7933 |
| S19 | −20.401 | 0.20 | | |
| S20 | 8.531 | 2.27 | 1.495467 | 66.8438 |
| S21 | −6.100 | 0.75 | 1.893086 | 38.5725 |
| S22 | 6.040 | D4 | | |
| S23 | 16.482 | 1.40 | 1.487489 | 70.4412 |
| S24 | −93.289 | 0.45 | 1.998031 | 24.9798 |
| S25 | 128.000 | D5 | | |
| S26 | INFINITY | 0.30 | 1.516798 | 64.1983 |
| S27 | INFINITY | 0.30 | | |
| S28 | INFINITY | 0.50 | 1.516798 | 64.1983 |
| S29 | INFINITY | D6 | | |

Aspherical coefficients are as represented below in Table 11.

TABLE 11

| Lens Surface | K | A | B | C | D |
|---|---|---|---|---|---|
| S5 | −1.00000 | 1.790093e−005 | 3.642646e−007 | 1.584075e−008 | 0.000000e+000 |
| S6 | −1.00000 | 8.376132e−005 | 1.883439e−007 | 6.912800e−009 | 0.000000e+000 |
| S7 | 2.55364 | 1.153207e−003 | 2.519152e−005 | 1.261243e−007 | 2.653260e−008 |
| S8 | −1.14334 | 3.703551e−004 | 3.515593e−005 | 1.054467e−007 | 5.200864e−008 |
| S13 | −1.96538 | 2.867511e−004 | 0.000000e+000 | 0.000000e+000 | 0.000000e+000 |
| S14 | −1.00000 | 1.398141e−005 | 0.000000e+000 | 0.000000e+000 | 0.000000e+000 |
| S18 | 0.90251 | −5.743343e−004 | −2.009461e−006 | −1.184487e−006 | 0.000000e+000 |

Data regarding variable distances when zooming is performed is as represented below in Table 12.

TABLE 12

| | Wide Angle Position | Intermediate Position | Telephoto Position |
|---|---|---|---|
| EFL | 6.401 | 15.042 | 28.803 |
| ω | 32.002 | 14.892 | 7.906 |
| Fno | 3.953 | 5.210 | 5.595 |
| D1 | 0.900 | 4.973 | 8.136 |
| D2 | 8.736 | 4.663 | 1.500 |
| D3 | 10.076 | 5.519 | 4.460 |
| D4 | 2.614 | 7.171 | 8.230 |
| D5 | 0.310 | 0.310 | 0.310 |

Table 13 shows that the first through third embodiments of the invention satisfy Equations 1 through 3.

TABLE 13

| | First Embodiment | Second Embodiment | Third Embodiment | Fourth Embodiment |
|---|---|---|---|---|
| Equation 1 | 1.944509 | 1.946106 | 2.0030 | 1.949357 |
| Equation 2 | 6.89 | 6.81 | 7.35 | 6.81 |
| Equation 3 | 3.703336 | 3.21254 | 3.572623 | 3.204005 |

A zoom lens system according to an embodiment of the invention may have a high zoom ratio and a small size. The zoom lens system may be appropriately used in image pickup apparatuses using a solid state image pickup device such as a charge-coupled device (CCD) or a complementary metal-oxide-semiconductor (CMOS), for example, digital still cameras, video cameras and cameras for portable terminals.

Figure 10:
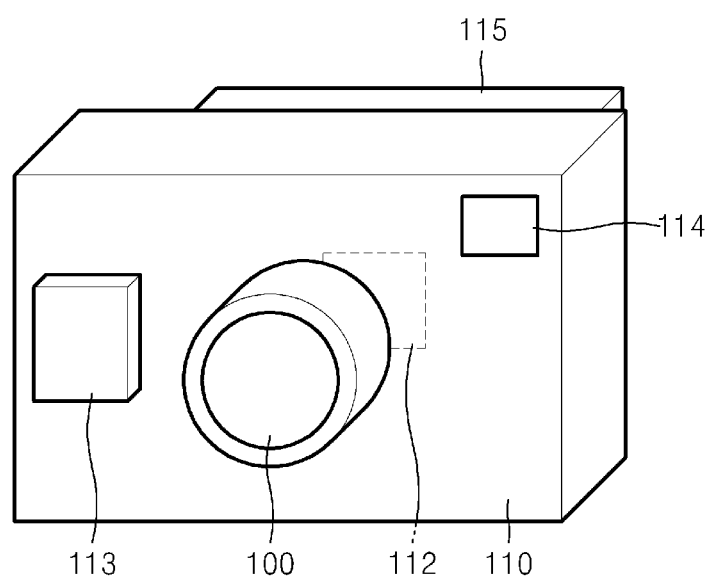
FIG. 10 is a perspective view of an image pickup apparatus according to an embodiment of the invention.

FIG. 10 illustrates an image pickup apparatus according to an embodiment of the invention.

Referring to FIG. 10, the image pickup apparatus includes the zoom lens system 100 illustrated in FIG. 1, 4, 6 or 8, and an imaging device 112 for receiving an image formed by the zoom lens system 100. The image pickup apparatus may include a recorder 113 for recording data corresponding to a subject image that is photoelectrically converted by the imaging device 112, a view finder 114 for viewing the subject image, and a display unit 115 for displaying the subject image. The view finder 114 and the display unit 115 are separately included in FIG. 10. However, alternatively, only the display unit 115 may be included without including the view finder 114. Although FIG. 10 illustrates a camera as an example of an image pickup apparatus, the invention is not limited thereto and may be applied to various optical devices in addition to the camera. As such, an optical device may have a small size and may photograph a subject at a high zoom ratio.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions. The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A zoom lens system comprising:
   a first lens group having a positive refractive power;
   a second lens group having a negative refractive power;
   a third lens group having a positive refractive power;
   a fourth lens group having a positive refractive power; and
   a fifth lens group having a positive refractive power, which are arranged in an order from an object side,
   wherein:
   the first lens group comprises one or more lenses having a negative refractive power, a reflector for changing an optical path, and one or more lenses having a positive refractive power;
   when zooming is performed from a wide angle position to a telephoto position, the first lens group, the third lens group and the fifth lens group remain fixed and the second lens group and the fourth lens group move, and
   the zoom lens system satisfies:

$Nd>1.94, 6.5 \leq Lt/L2 \leq 7.5,$ and $3.0 \leq F1/(Ft/Fw) \leq 3.9;$ where Nd represents an refractive index of the one or more lenses having a negative refractive power in the first lens group;

Lt represents an overall length of the zoom lens system at the telephoto position;
   L2 represents an amount of movement of the second lens group when zooming is performed from the wide angle position to the telephoto position;
   F1 represents a focal length of the first lens group;
   Fw represents a focal length at the wide angle position of the zoom lens system; and
   Ft represents a focal length at the telephoto position of the zoom lens system.

2. The zoom lens system of claim 1, wherein, when zooming is performed from the wide angle position to the telephoto position, a distance between the second lens group and the third lens group is reduced and a distance between the third lens group and the fourth lens group is also reduced.

3. The zoom lens system of claim 1, wherein the second lens group comprises one or more biconcave aspherical lenses.

4. The zoom lens system of claim 1, wherein the third lens group comprises at least one aspherical lens.

5. The zoom lens system of claim 1, wherein the fourth lens group performs focusing according to variations in distance to an object.

6. The zoom lens system of claim 1, wherein the fifth lens group comprises a lens having a meniscus shape that is convex toward an image side.

7. The zoom lens system of claim 1, wherein the third lens group comprises a stop on an image side surface of a lens that is the closest to the image side.

8. The zoom lens system of claim 1, wherein a back focal length of the zoom lens system is less than a focal length at the wide angle position.

9. A zoom lens system comprising:
   a first lens group having a positive refractive power;
   a second lens group having a negative refractive power;
   a third lens group having a positive refractive power;
   a fourth lens group having a positive refractive power; and
   a fifth lens group having a positive refractive power, which are arranged in an order from an object side,
   wherein:
   the first lens group comprises a lens having a negative refractive power, a reflector for changing an optical path, and a lens having a positive refractive power;
   when zooming is performed from a wide angle position to a telephoto position, the second lens group and the fourth lens group move, the fifth lens group does not move, and
   the zoom lens system satisfies:

$6.5 \leq Lt/L2 \leq 7.5,$ and $3.0 \leq F1/(Ft/Fw) \leq 3.9;$ where

Lt represents an overall length of the zoom lens system at the telephoto position;
   L2 represents an amount of movement of the second lens group when zooming is performed from the wide angle position to the telephoto position;
   F1 represents a focal length of the first lens group;
   Fw represents a focal length at the wide angle position of the zoom lens system; and
   Ft represents a focal length at the telephoto position of the zoom lens system.

10. The zoom lens system of claim 9, wherein, when zooming is performed from the wide angle position to the telephoto position, a distance between the second lens group and the third lens group is reduced and a distance between the third lens group and the fourth lens group is also reduced.

11. The zoom lens system of claim 9, wherein the second lens group comprises one or more biconcave aspherical lenses.

12. The zoom lens system of claim 9, wherein the fifth lens group comprises a lens having a meniscus shape that is convex toward an image side.

13. The zoom lens system of claim 9, wherein a back focal length of the zoom lens system is less than a focal length at the wide angle position.

14. An image pickup apparatus comprising
a zoom lens system; and
an imaging device for receiving an image formed by the zoom lens system, wherein:
the zoom lens system comprises a first lens group having a positive refractive power, a second lens group having a negative refractive power, a third lens group having a positive refractive power, a fourth lens group having a positive refractive power, and a fifth lens group having a positive refractive power, which are arranged in an order from an object side;
the first lens group comprising one or more lenses having a negative refractive power, a reflector for changing an optical path, and one or more lenses having a positive refractive power
the first lens group comprises one or more lenses having a negative refractive power, a reflector for changing an optical path, and one or more lenses having a positive refractive power;
when zooming is performed from a wide angle position to a telephoto position, the first lens group, the third lens group and the fifth lens group remain fixed and the second lens group and the fourth lens group move, and the zoom lens system satisfies:

$$Nd > 1.94, 6.5 \leq Lt/L2 \leq 7.5, \text{ and } 3.0 \leq F1/(Ft/Fw) \leq 3.9;$$
where Nd represents a refractive index of the one or more lenses having a negative refractive power in the first lens group;
Lt represents an overall length of the zoom lens system at the telephoto position;
L2 represents an amount of movement of the second lens group when zooming is performed from the wide angle position to the telephoto position;
F1 represents a focal length of the first lens group;
Fw represents a focal length at the wide angle position of the zoom lens system; and
Ft represents a focal length at the telephoto position of the zoom lens system.

15. An image pickup apparatus comprising:
a zoom lens system; and
an imaging device for receiving an image formed by the zoom lens system, wherein:
the zoom lens system comprises a first lens group having a positive refractive power, a second lens group having a negative refractive power, a third lens group having a positive refractive power, a fourth lens group having a positive refractive power, and a fifth lens group having a positive refractive power, which are arranged in an order from an object side;
the first lens group comprises a lens having a negative refractive power for changing an optical path, and a lens having a positive refractive power;
when zooming is performed from a wide angle position to a telephoto position, the second lens group, the fourth lens group move, the fifth lens group does not move, and the zoom lens system satisfies:

$$6.5 \leq Lt/L2 \leq 7.5, \text{ and } 3.0 \leq F1/(Ft/Fw) \leq 3.9;$$
where

Lt represents an overall length of the zoom lens system at the telephoto position;
L2 represents an amount of movement of the second lens group when zooming is performed from the wide angle position to the telephoto position;
F1 represents a focal length of the first lens group;
Fw represents a focal length at the wide angle position of the zoom lens system; and
Ft represents a focal length at the telephoto position of the zoom lens system.

* * * * *